United States Patent [19]
Miyaji et al.

[11] Patent Number: 5,093,218
[45] Date of Patent: Mar. 3, 1992

[54] ELECTROPHOTOGRAPHIC PHOTOSENSITIVE MEMBER HAVING AN AZO PIGMENT

[75] Inventors: Toshie Miyaji; Hajime Miyazaki; Yoshio Kashizaki, all of Kanagawa, Japan

[73] Assignee: Canon Kabushiki Kaisha, Tokyo, Japan

[21] Appl. No.: 599,760

[22] Filed: Oct. 19, 1990

[30] Foreign Application Priority Data

Oct. 19, 1989 [JP] Japan .................................. 1-270251
Oct. 19, 1989 [JP] Japan .................................. 1-270252
Oct. 19, 1989 [JP] Japan .................................. 1-270253

[51] Int. Cl.$^5$ ............................................. G03G 5/06
[52] U.S. Cl. ........................................ 430/58; 430/73; 430/75; 430/76; 430/79; 430/126; 355/271; 355/296
[58] Field of Search ....................... 430/58, 73, 75, 76, 430/79, 126; 355/271, 296

[56] References Cited

U.S. PATENT DOCUMENTS

| | | |
|---|---|---|
| 4,123,270 | 10/1978 | Heil et al. |
| 4,247,614 | 1/1981 | Ohta et al. |
| 4,251,613 | 2/1981 | Sasaki et al. |
| 4,251,614 | 2/1981 | Sasaki et al. |
| 4,256,821 | 3/1981 | Enomoto et al. |
| 4,260,672 | 4/1981 | Sasaki et al. |
| 4,293,628 | 10/1981 | Hashimoto et al. |
| 4,426,432 | 1/1984 | Sawada et al. |
| 4,433,039 | 9/1986 | Takiguchi et al. |
| 4,895,782 | 1/1990 | Koyama et al. |

FOREIGN PATENT DOCUMENTS 58-95742 6/1983 Japan .
63-264762 11/1988 Japan .

Primary Examiner—John Goodrow
Attorney, Agent, or Firm—Fitzpatrick, Cella, Harper & Scinto

[57] ABSTRACT

An electrophotographic photosensitive member comprising: a conductive substrate and a photosensitive layer on the conductive substrate, said photosensitive layer containing an azo pigment of the following formula (1):

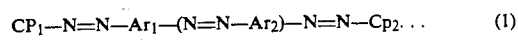

wherein $Ar_1$ and $Ar_2$ are each a substituted or unsubstituted aromatic cyclic group optionally bonded through a bonding group or a substituted or unsubstituted heterocyclic group optionally bonded through a bonding group, and $cp_1$ and $cp_2$ are each a group having the following formula (2), (3), (4) or (5):

(Abstract continued on next page.)

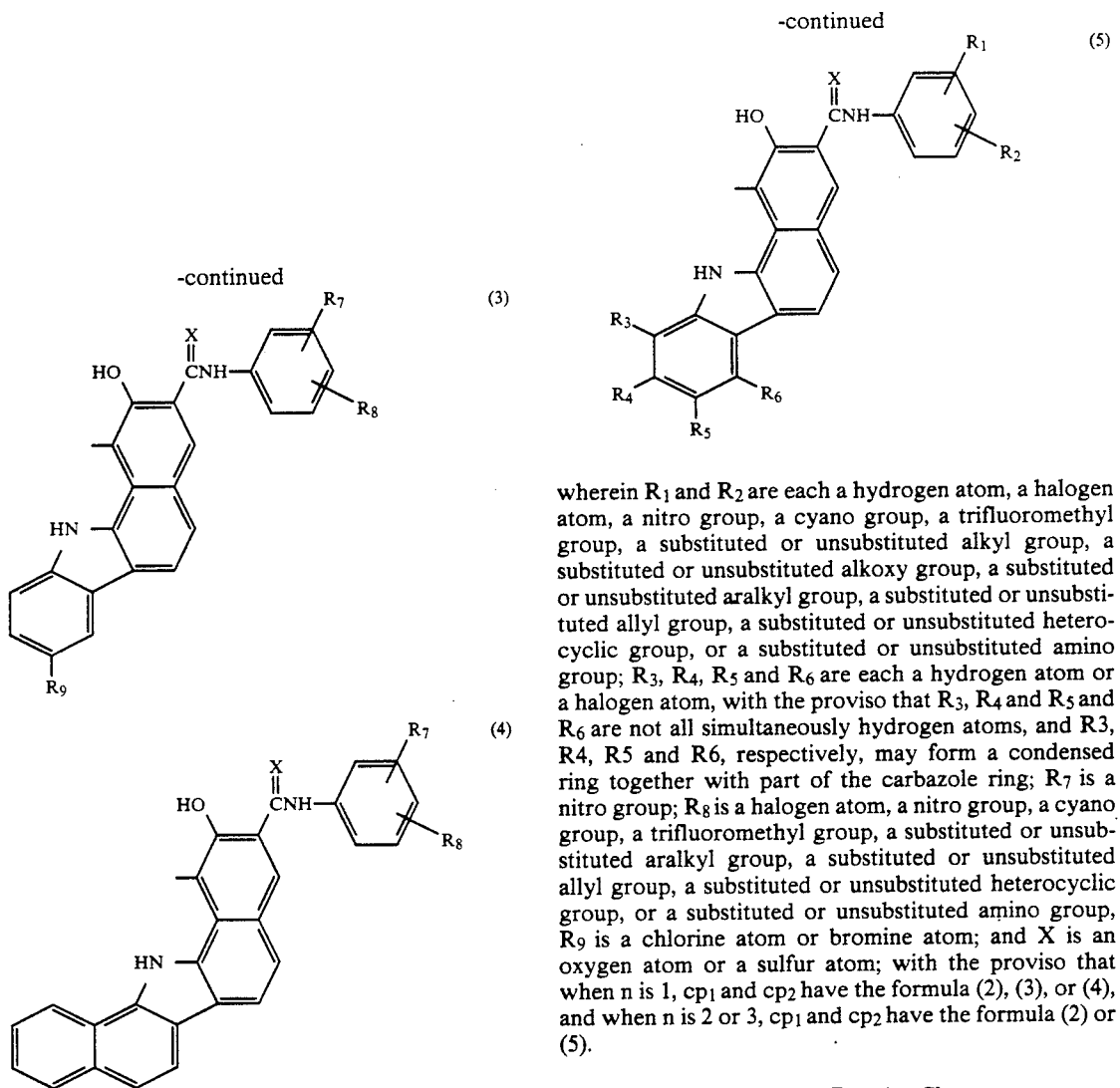

wherein $R_1$ and $R_2$ are each a hydrogen atom, a halogen atom, a nitro group, a cyano group, a trifluoromethyl group, a substituted or unsubstituted alkyl group, a substituted or unsubstituted alkoxy group, a substituted or unsubstituted aralkyl group, a substituted or unsubstituted allyl group, a substituted or unsubstituted heterocyclic group, or a substituted or unsubstituted amino group; $R_3$, $R_4$, $R_5$ and $R_6$ are each a hydrogen atom or a halogen atom, with the proviso that $R_3$, $R_4$ and $R_5$ and $R_6$ are not all simultaneously hydrogen atoms, and R3, R4, R5 and R6, respectively, may form a condensed ring together with part of the carbazole ring; $R_7$ is a nitro group; $R_8$ is a halogen atom, a nitro group, a cyano group, a trifluoromethyl group, a substituted or unsubstituted aralkyl group, a substituted or unsubstituted allyl group, a substituted or unsubstituted heterocyclic group, or a substituted or unsubstituted amino group, $R_9$ is a chlorine atom or bromine atom; and X is an oxygen atom or a sulfur atom; with the proviso that when n is 1, cp1 and cp2 have the formula (2), (3), or (4), and when n is 2 or 3, cp1 and cp2 have the formula (2) or (5).

11 Claims, 1 Drawing Sheet

ELECTROPHOTOGRAPHIC PHOTOSENSITIVE MEMBER HAVING AN AZO PIGMENT

BACKGROUND OF THE INVENTION

1. Field of the Invention

The present invention relates to an electrophotographic photosensitive member and, more particularly, to an electrophotographic photosensitive member having a photosensitive layer containing an azo pigment of a specific structure.

2. Description of the Prior Art

In general, an organic photosensitive members having a photosensitive layer containing an organic photoconductive substance offer various advantages over inorganic photosensitive members, and various such organic photosensitive members have been proposed and used.

Typical examples of such organic photoconductive substances are: organic photoconductive polymers such ss poly-N-vinyl carbazole and polyvinyl anthracene; low-molecular organic photoconductive substances such as carbazole compounds, anthracene compounds, pyrazoline compounds, oxadiazole compounds, hydrazone compounds and polyacryl-alkane compounds; and organic pigments and dyes such as phthalocyanine pigments, azo pigments, polycyclic quinone pigments, pellyrene pigments, indigo dyes, thio-indigo dyes, and methine squalinate dyes; and so on.

On the other hand, so-called function separation type photosensitive members have been proposed in which a photosensitive layer includes a charge generating layer containing a charge generating substance and a charge transporting layer containing a charge transporting substance. Photoconductive azo pigments suitable for use as the charge generating substance in such function separation type photosensitive member are disclosed, for example, in the specifications of U.S. Pat. Nos. 4123270, 4247614, 4251613, 4251614, 4256821, 4260672 and 4293628.

Electrophotographic apparatuses such as printers are finding increasing use as output means of microcomputers and wordprocessors, and light source devices capable of emitting lights of long wavelengths, e.g., LEDs and laser diodes, are becoming popular. This has given a rise to the demand for electrophotographic photosensitive members which can effectively be used in combination with light sources emitting radiation of long wavelengths.

The output power spectrum, including the wavelength of the maximum power λ max of the laser diode undesirably varies and fluctuates depending on various factors such as variation in the characteristics of individual laser diodes, ambient air temperature and rise in the temperature of the emitting junction of the diode incurred during the emission. Therefore, an electrophotographic photosensitive member is required to exhibit a flat spectral sensitivity response characteristic distribution over the entire range of emission wavelengths. Unfortunately, however, electrophotographic photosensitive members, which have been conventionally used in monochromatic or color printers, could not meet the demand for flat spectral sensitivity distribution. In order to overcome this problem, therefore, it has been necessary to take a suitable countermeasure, such as careful selection of the laser diodes, control of the laser temperature, and so forth, which poses problems such as a rise in the costs of the printers and increase in the size of the required apparatus.

The spectral sensitivity distribution can be regarded as being flat when the amount of change or variation in the sensitivity is 0 to 15%, preferably 0 to 10%, in the range of wavelength emission of laser diodes, which is generally 760 nm to 800 nm.

Japanese Patent Laid-Open Publication No. 63-264762 discloses an azo pigment which has a specific coupler component for an electrophotographic photosensitive member which is intended for use in combination with laser diodes. This electrophotographic photosensitive member, however, is still unsatisfactory in that the amount of variation in the spectral sensitivity is 25% at the smallest in the above-mentioned emission wavelength region of 760 to 800 nm.

SUMMARY OF THE INVENTION

Accordingly, an object of the present invention is to provide an electrophotographic photosensitive member which stably exhibits high levels of sensitivity over a broad wavelength range, particularly at long wavelengths.

Another object of the present invention is to provide an electrophotographic photosensitive member which exhibits stable potential characteristics even after a repeated use.

Further objects of the present invention are to provide an electrophotographic apparatus which utilizes the electrophotographic photosensitive member, as well as a facsimile which incorporates such an electrophotographic apparatus as a printer.

To these ends, according to one aspect of the present invention, there is provided an electrophotographic photosensitive member comprising: a conductive substrate and a photosensitive layer on the conductive substrate, said photosensitive layer containing an azo pigment of the following formula (1):

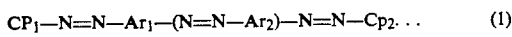

wherein $Ar_1$ and $Ar_2$ are each a substituted or unsubstituted aromatic cyclic group optionally bonded through a bonding group or a substituted or unsubstituted heterocyclic group optionally bonded through a bonding group, and $cp_1$ and $cp_2$ are each a group having the following formula (2), (3), (4) or (5):

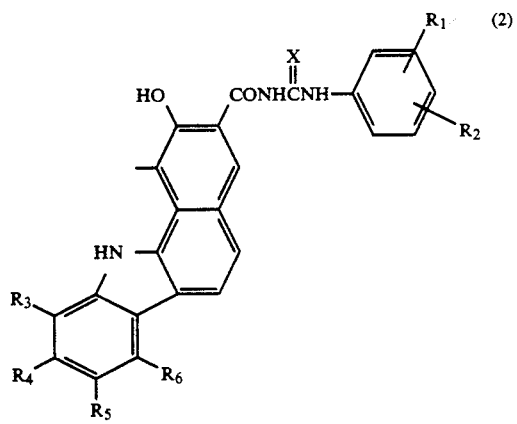

-continued

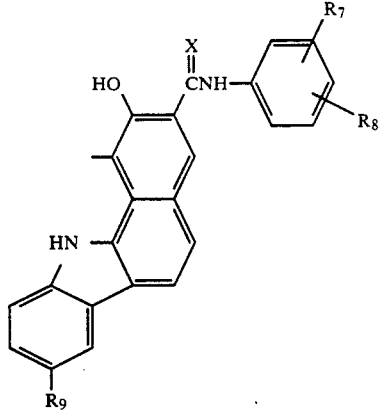

(3)

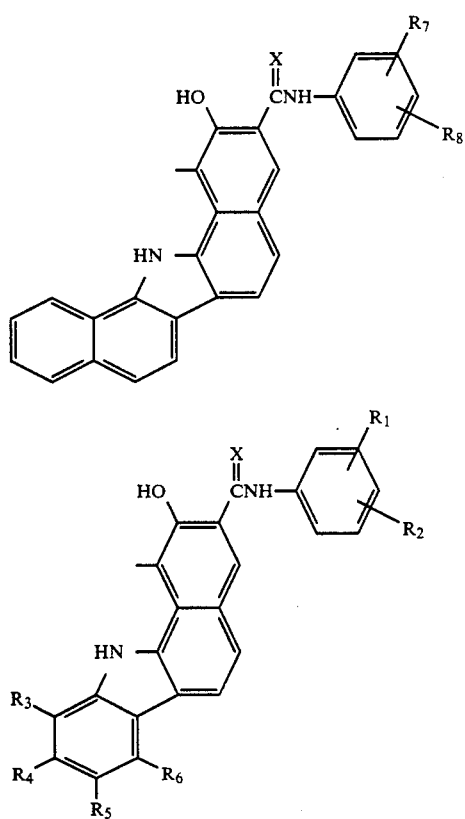

(4)

(5)

wherein $R_1$ and $R_2$ are each a hydrogen atom, a halogen atom, a nitro group, a cyano group, a trifluoromethyl group, a substituted or unsubstituted alkyl group, a substituted or unsubstituted alkoxy group, a substituted or unsubstituted aralkyl group, a substituted or unsubstituted allyl group, a substituted or unsubstituted heterocyclic group, or a substituted or unsubstituted amino group; $R_3$, $R_4$, $R_5$ and $R_6$ are each a hydrogen atom or a halogen atom, with the proviso that $R_3$, $R_4$, $R_5$ and $R_6$ are not all simultaneously hydrogen atoms, and $R_3$, $R_4$, $R_5$ and $R_6$, respectively, may form a condensed ring together with part of the carbazole ring; $R_7$ is a nitro group; $R_8$ is a halogen atom, a nitro group, a cyano group, a trifluoromethyl group, a substituted or unsubstituted aralkyl group, a substituted or unsubstituted allyl group, a substituted or unsubstituted heterocyclic group, or a substituted or unsubstituted amino group, $R_9$ is a chlorine atom or bromine atom; and X is an oxygen atom or a sulfur atom; with the proviso that when n is 1, $cp_1$ and $cp_2$ have the formula (2), (3) or (4), and when n is 2 or 3, $cp_1$ and $cp_2$ have the formula (2) or (5).

The above and other objects, features and advantages of the present invention will become clear from the following description of the preferred embodiments.

DETAILED DESCRIPTION OF THE INVENTION

Figure 1:
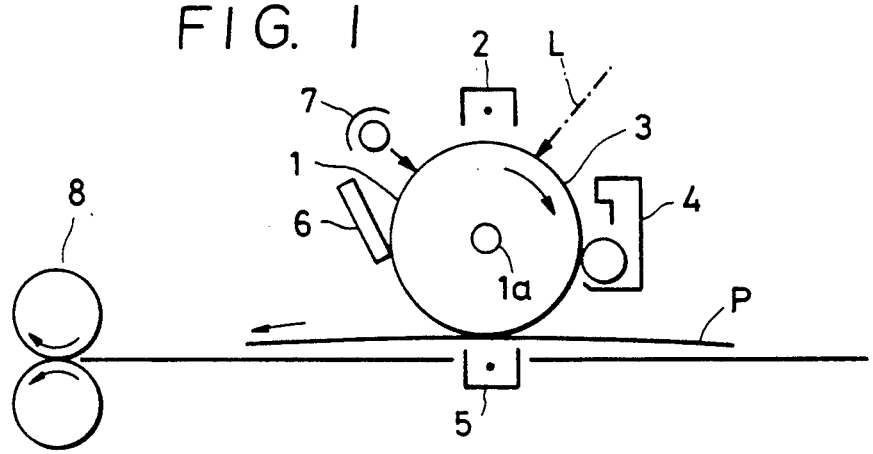
FIG. 1 is a schematic illustration of the construction of an electrophotographic apparatus which uses an electrophotographic photosensitive member in accordance with the present invention.

The electrophotographic photosensitive member of the present invention has a photosensitive layer containing an azo pigment expressed by the formula (1).

$Ar_1$ and $Ar_2$, respectively, are an aromatic groups which may be bonded through a bonding group and which may have a substituent, or a heterocyclic group which may be bonded through a bonding group or which may have a substituent. Examples of such aromatic groups are benzene, naphthalene, fluorene, phenanthrene, anthracene and pyrene. Examples of the heterocyclic groups are aromatic heterocyclic groups such as furan, thiophene, pyridine, indole, benzothiazole, carbazole, acridone, dibenzothiophene, benzooxadiazole, benzotriazole, oxadiazole and thiazole, as well as compounds formed by bonding these aromatic rings directly or through an aromatic or non-aromatic group, such as triphenylamine, diphenylamine, N-methyldiphenylamine, biphenyl, terphenyl, binaphtyl, fluolenone, phenanthraquinone, anthraquinone, benzanthrone, diphenyloxadiazole, phenylbenzoxazole, diphenylmethane, diphenylsulfone, diphenylether, benzophenone, stilbene, distyrylbenzene, tetraphenyl-p-phenylenediamine and tetraphenylbenzidine.

Examples of the substituent which $Ar_1$ and $Ar_2$ may have are an alkyl group such as a methyl, ethyl or propyl group, an alkoxy group such as a methoxy, ethoxy and propyl group, a halogen atom such as a fluorine, chlorine or bromine atom, a nitro group and a cyano group.

Examples of the halogen atom of $R_1$, $R_2$ and $R_8$ are fluorine atom, chlorine atom and bromine atom. $R_1$, $R_2$ and $R_8$ also may be an alkyl group such as a methyl, ethyl or propyl group, an alkoxy group such as a methoxy, ethoxy and propoxy group, an aralkyl group such as a benzyl and phenetyl group, an allyl group such as a phenyl, naphtyl, anthryl and fluorenyl group, a heterocyclic group such as pyridyl, quinolyl, furyl and thienyl group, or a substituted amino group such as dimethyl amino, diethyl amino, pyrrolidino and diphenyl amino group.

Examples of the substituent for the above-mentioned alkyl group, alkoxy group, aralkyl group and allyl group are alkyl groups such as methyl, ethyl and propyl groups, alkoxy groups such as methoxy, ethoxy and propoxy groups, halogen atoms such as fluorine, chlorine and bromine atoms, nitro groups and cyano groups.

Practical examples of the azo pigment suitable for use in the present invention are shown below.

Pigment Example (1)
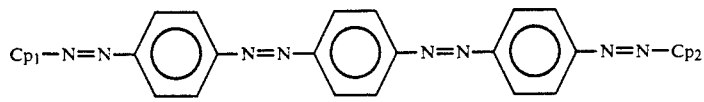
Cp₁, Cp₂:
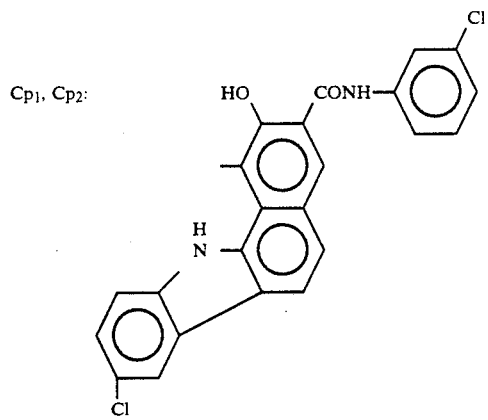
Pigment Example (2)
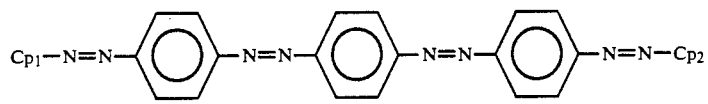
Cp₁, Cp₂:
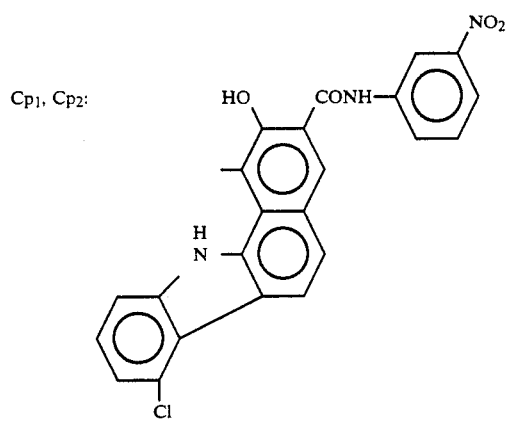
Pigment Example (3)
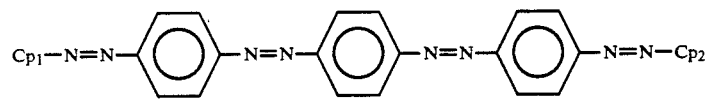
Cp₁, Cp₂:
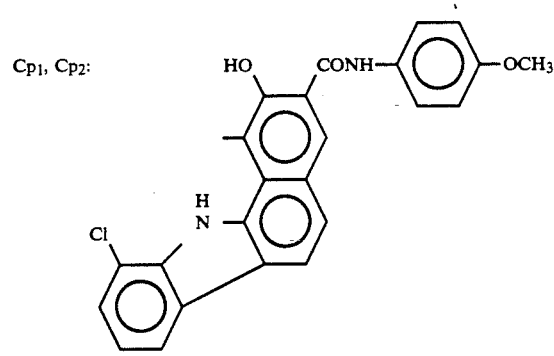
Pigment Example (4)
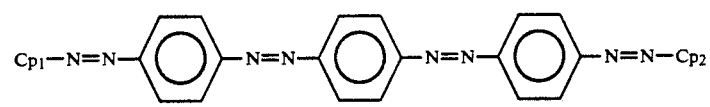

Cp₁, Cp₂:
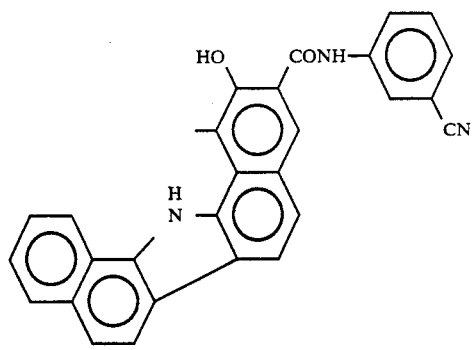
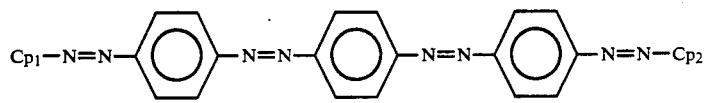
Pigment Example (5)
Cp₁, Cp₂:
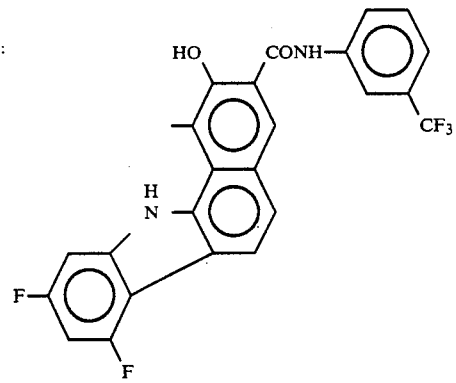
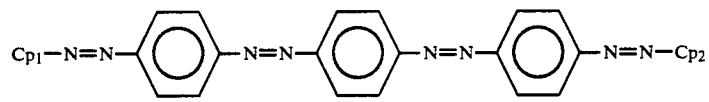
Pigment Example (6)
Cp₁:
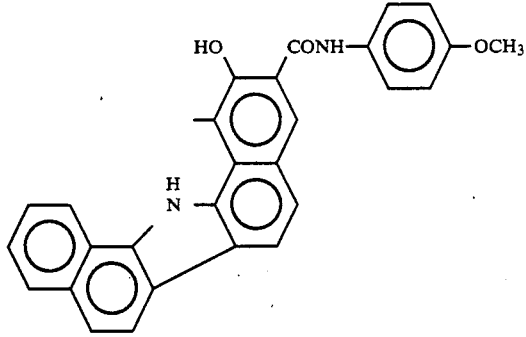
Cp₂:
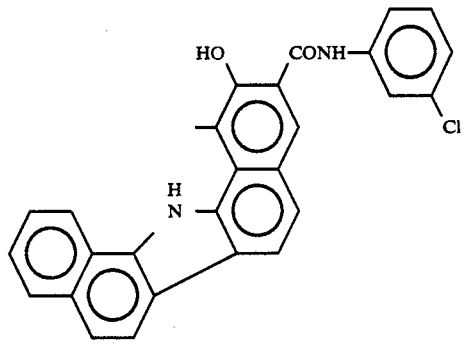

-continued
Pigment Example (7)
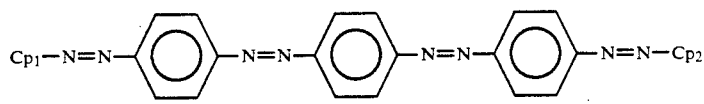
Cp₁, Cp₂:
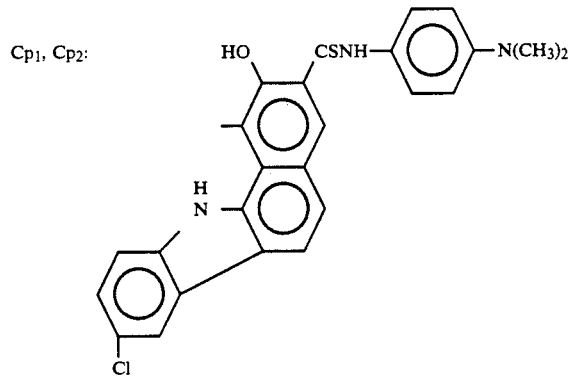
Pigment Example (8)
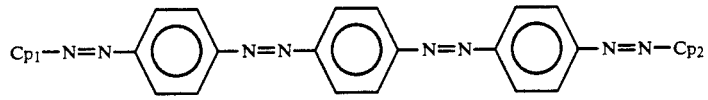
Cp₁, Cp₂:
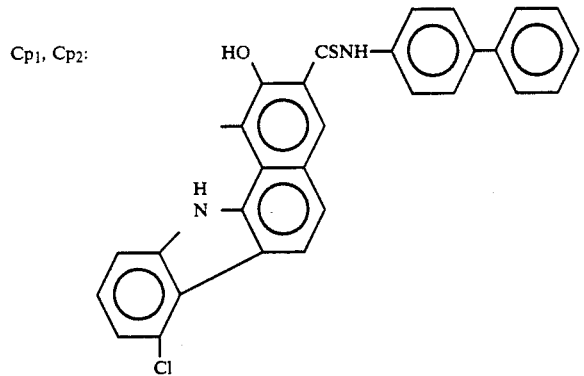
Pigment Example (9)
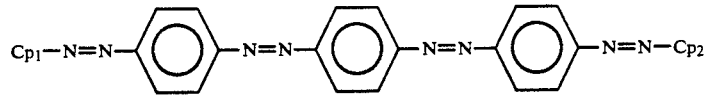
Cp₁, Cp₂:
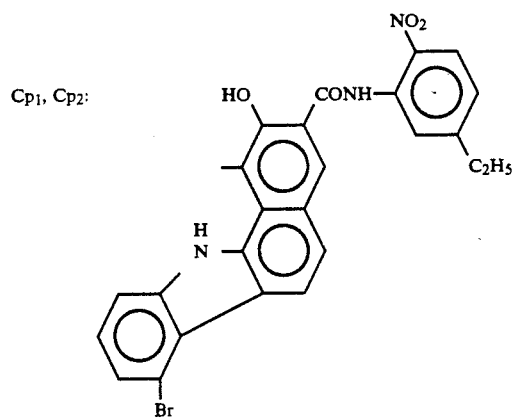

-continued
Pigment Example (10)
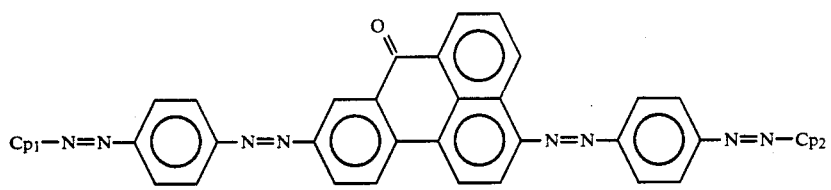
Cp₁, Cp₂:
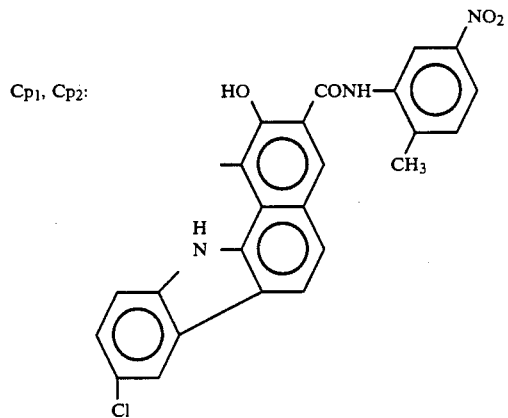
Pigment Example (11)
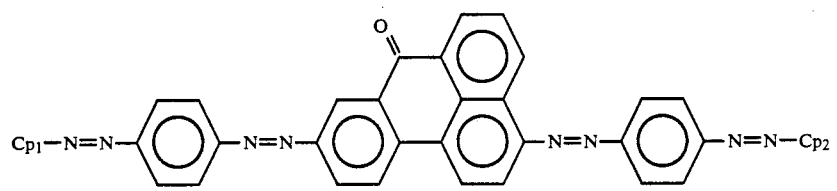
Cp₁, Cp₂:
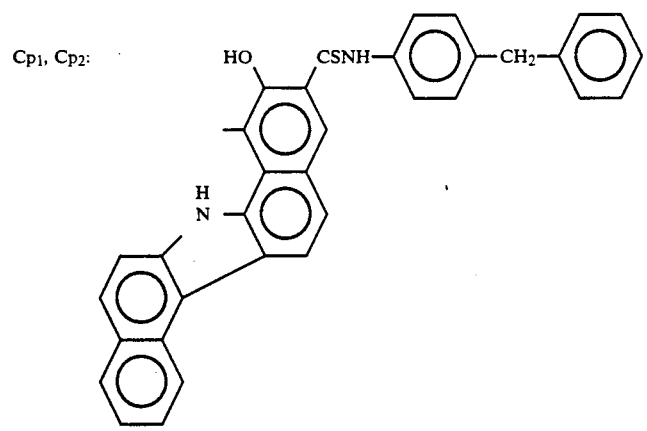
Pigment Example (12)
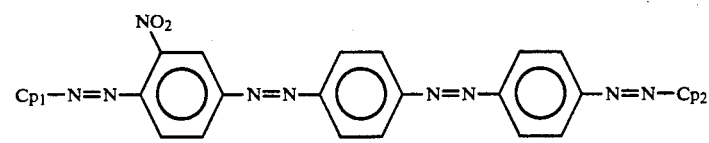

-continued
Cp₁, Cp₂:
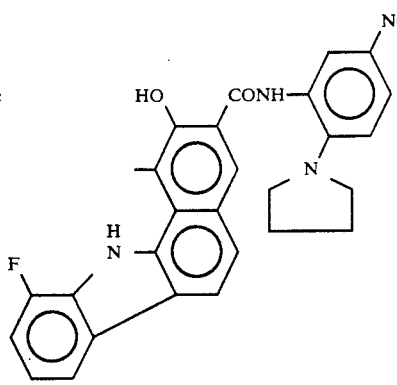
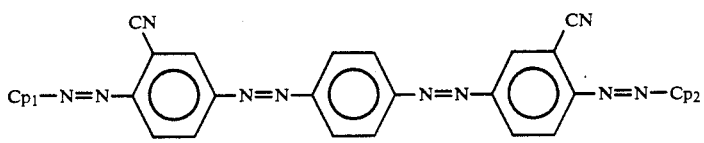
Pigment Example (13)
Cp₁, Cp₂:
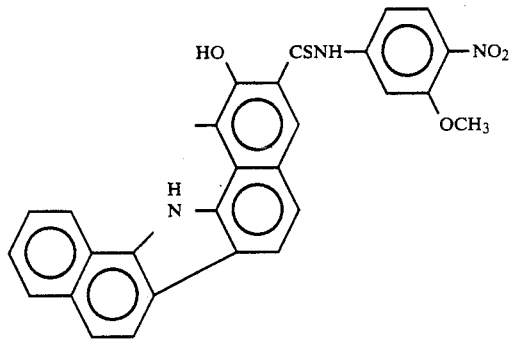
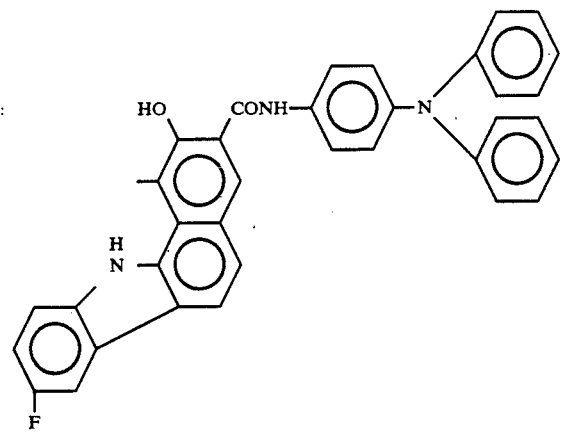
Pigment Example (14)
Cp₁, Cp₂:
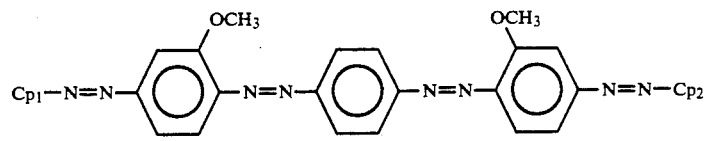
Pigment Example (15)

-continued
Cp₁, Cp₂:
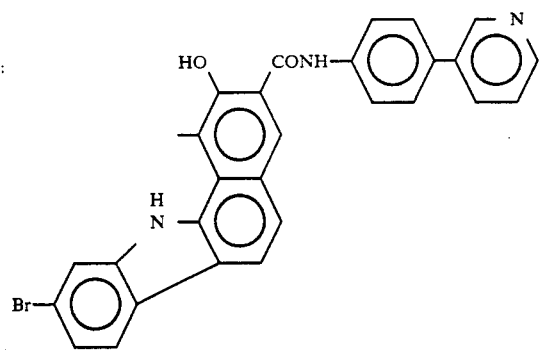
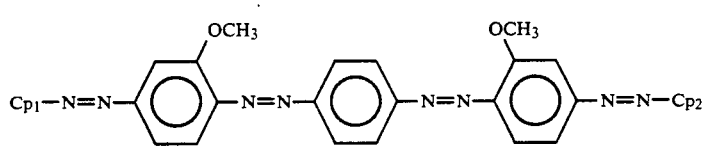
Cp₁, Cp₂:
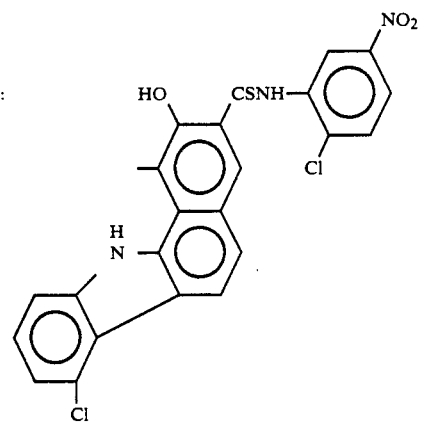
Pigment Example (16)
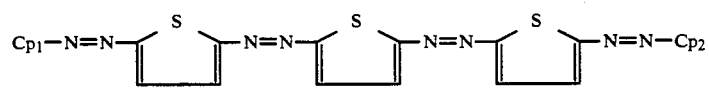
Pigment Example (17)
Cp₁, Cp₂:
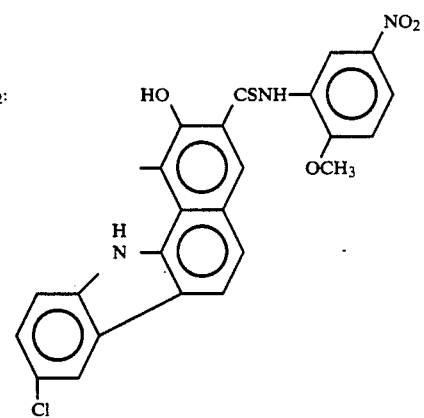
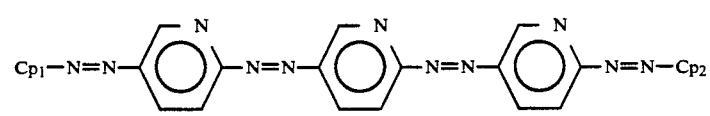
Pigment Example (18)

-continued
Cp₁, Cp₂:
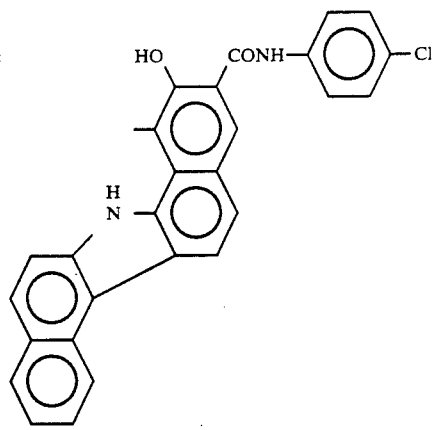
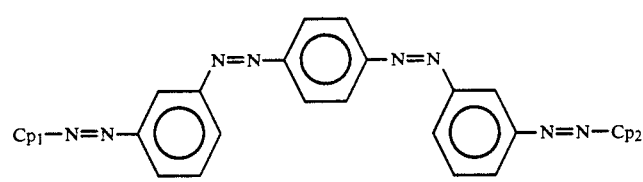
Cp₁, Cp₂:
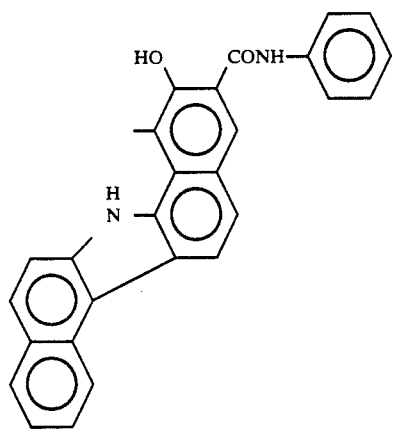
Pigment Example (19)
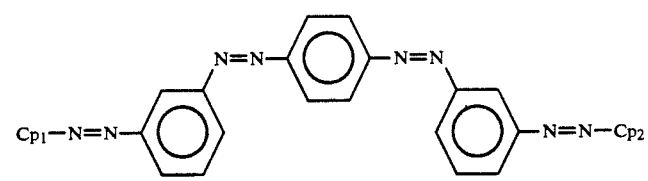
Cp₁, Cp₂:
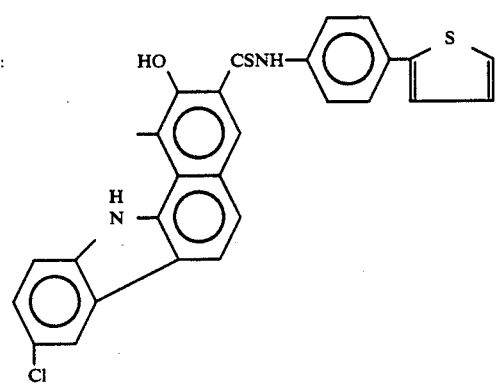
Pigment Example (20)

-continued
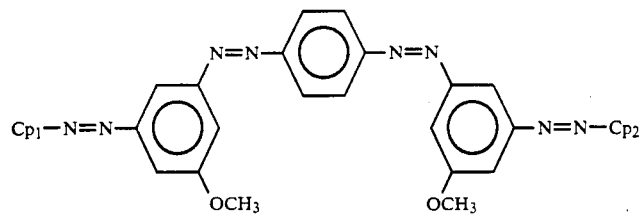
Pigment Example (21)
Cp₁, Cp₂:
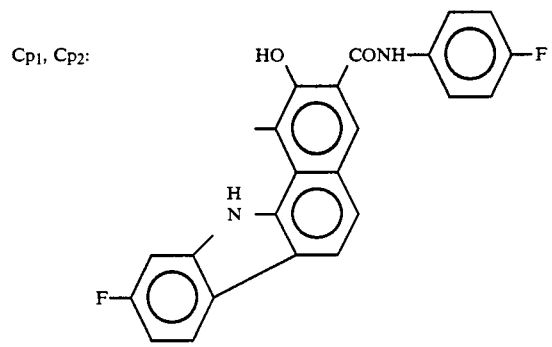
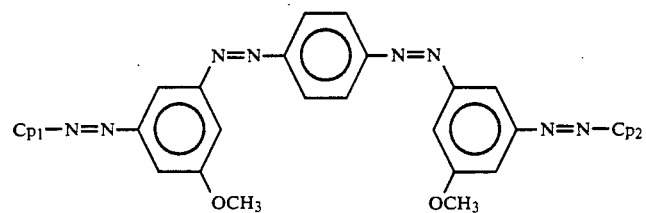
Pigment Example (22)
Cp₁, Cp₂:
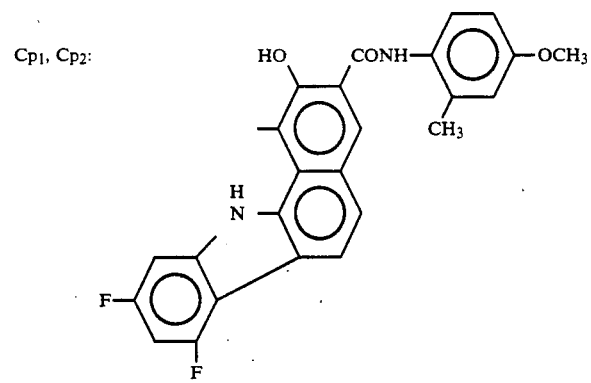
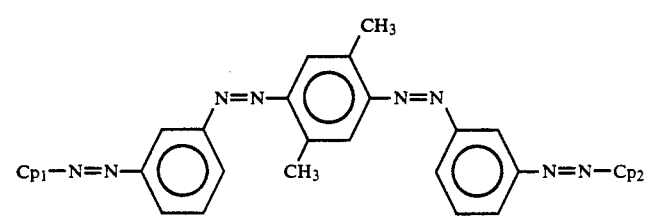
Pigment Example (23)

Cp₁, Cp₂:
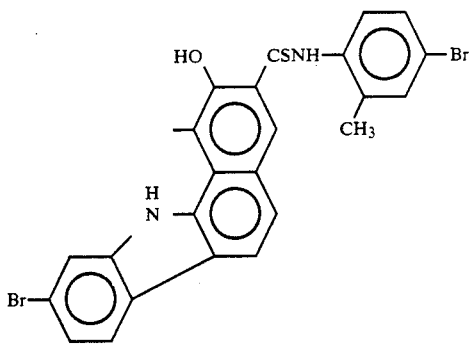
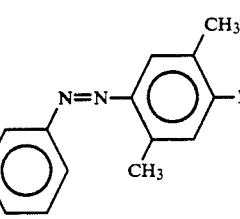
Cp₁, Cp₂:
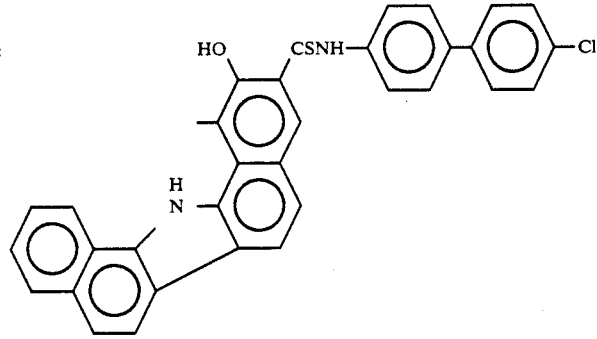
Pigment Example (24)
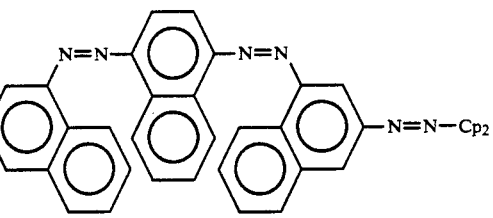
Pigment Example (25)
Cp₁, Cp₂:
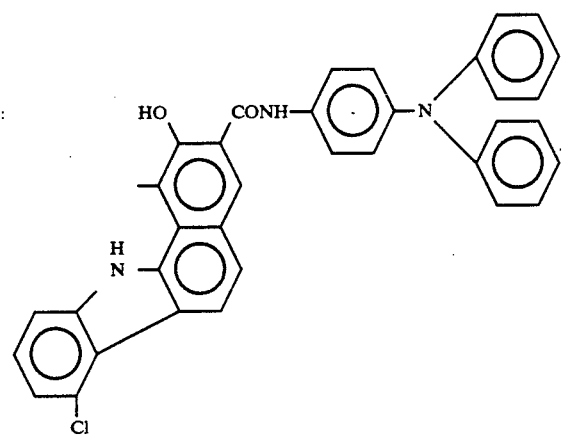

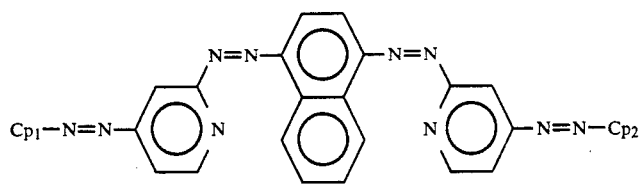
Cp₁, Cp₂:
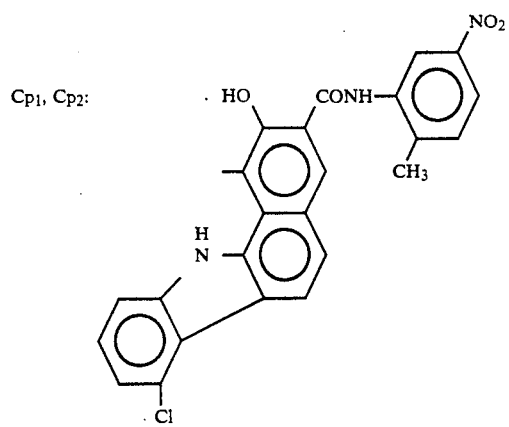
Pigment Example (26)
Cp₁, Cp₂:
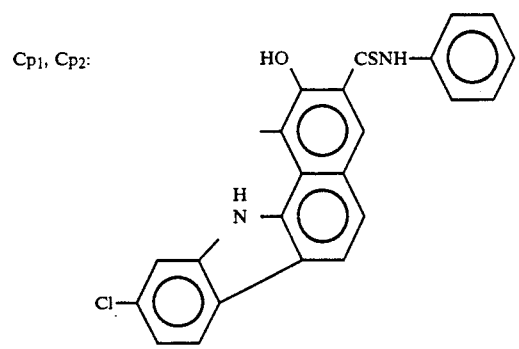
Pigment Example (27)
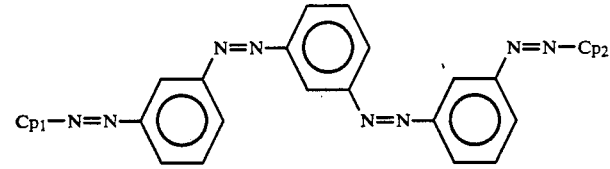
Cp₁, Cp₂:
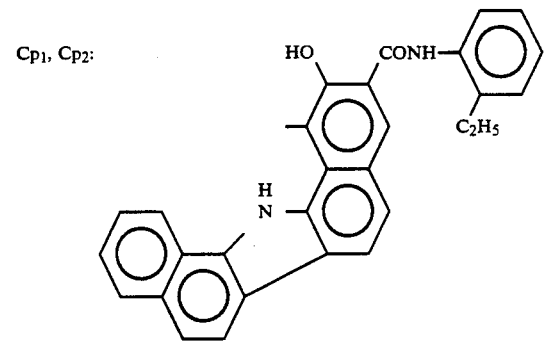
Pigment Example (28)

Pigment Example (29)
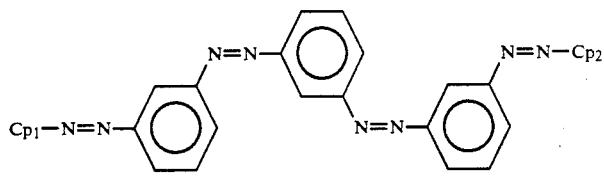
Cp₁, Cp₂:
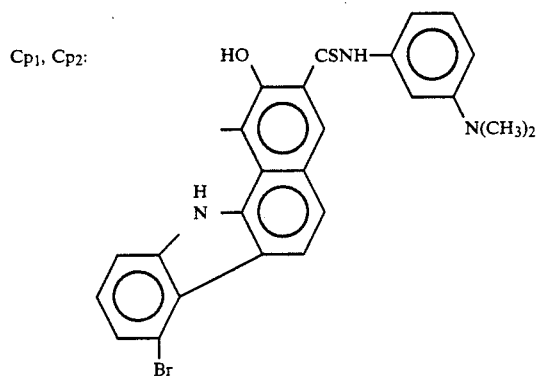
Pigment Example (30)
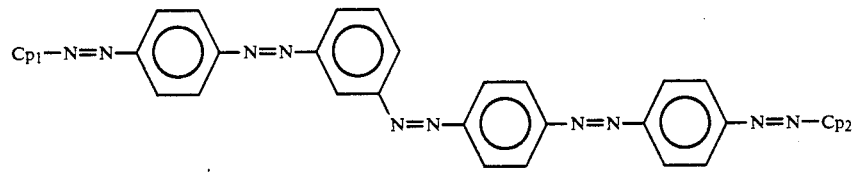
Cp₁, Cp₂:
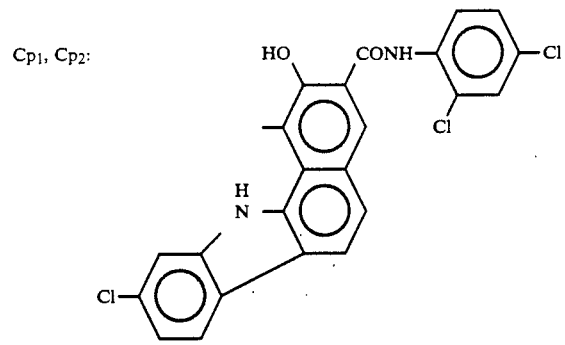
Pigment Example (31)
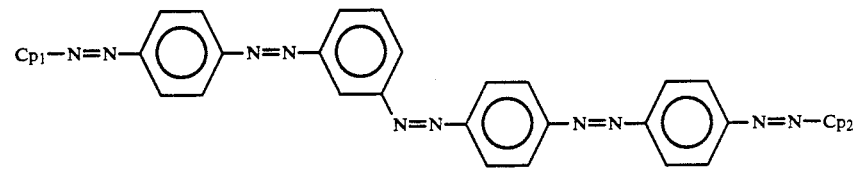

Cp₁, Cp₂:
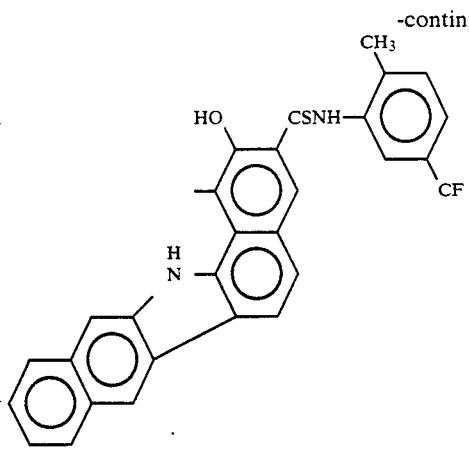
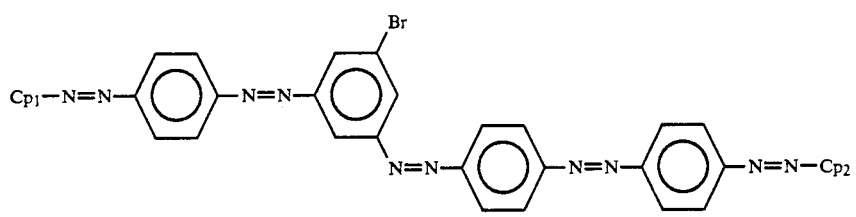
Pigment Example (32)
Cp₁, Cp₂:
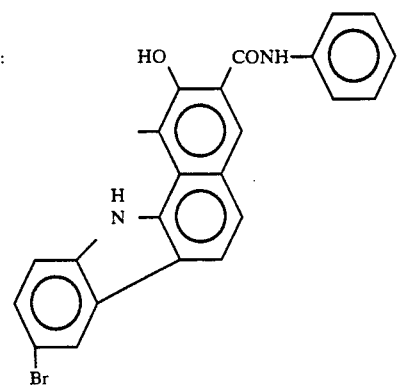
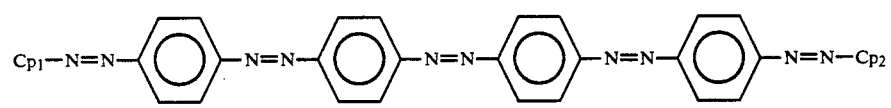
Pigment Example (33)
Cp₁, Cp₂:
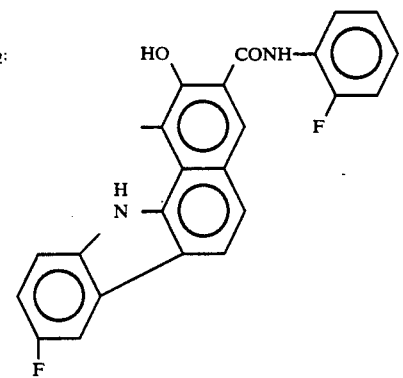
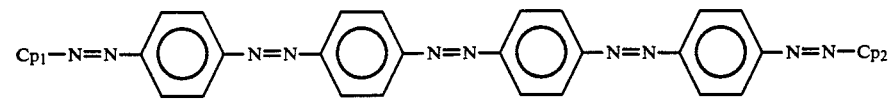
Pigment Example (34)

Cp₁, Cp₂:
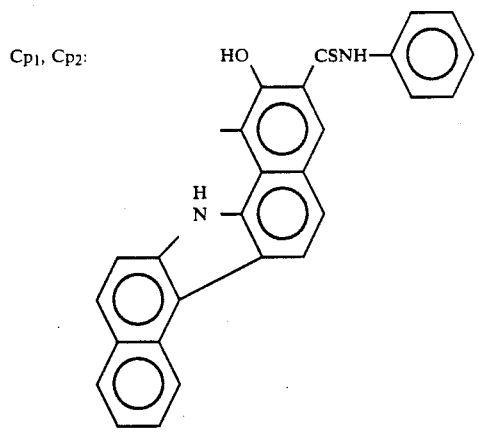
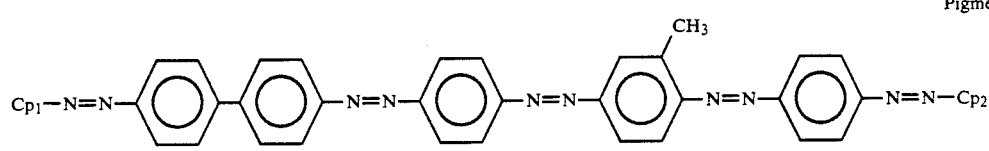
Pigment Example (35)
Cp₁, Cp₂:
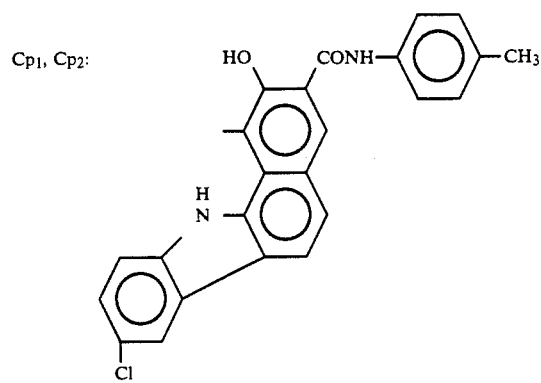
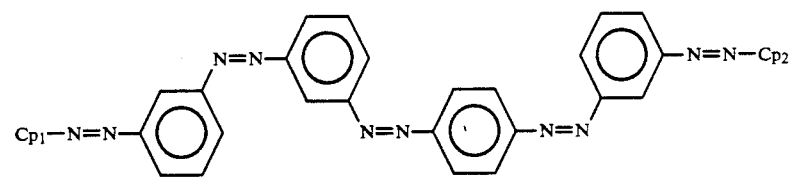
Pigment Example (36)
Cp₁, Cp₂:
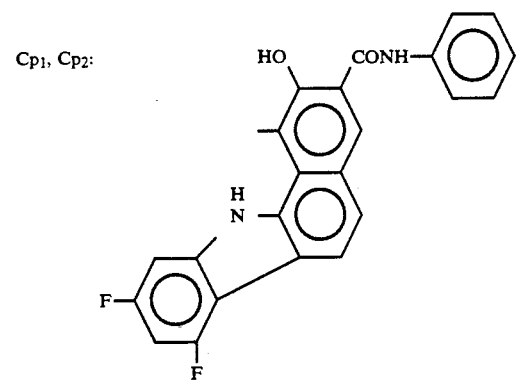

-continued
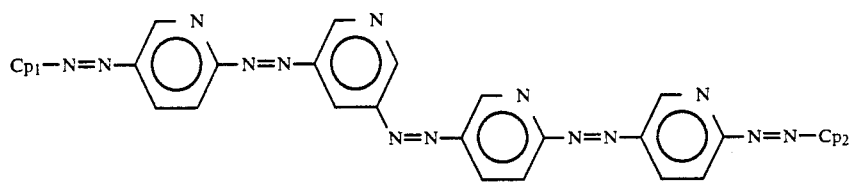
(37)
Cp₁, Cp₂:
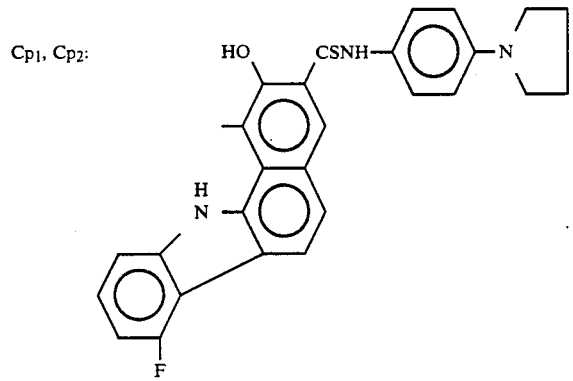
Pigment Example (38)
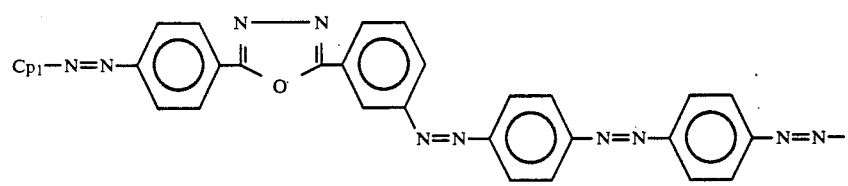
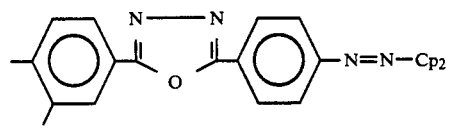
Cp₁, Cp₂:
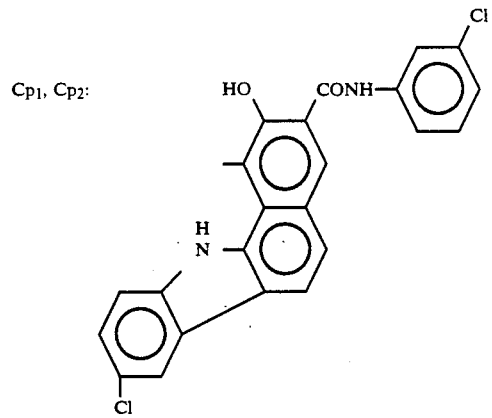
Pigment Example (39)
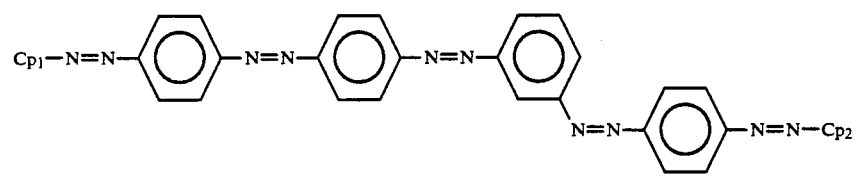

-continued
Cp₁:
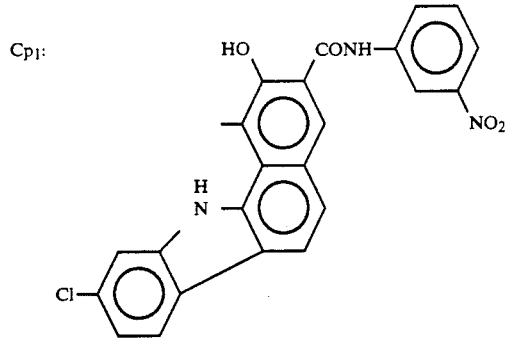
Cp₂:
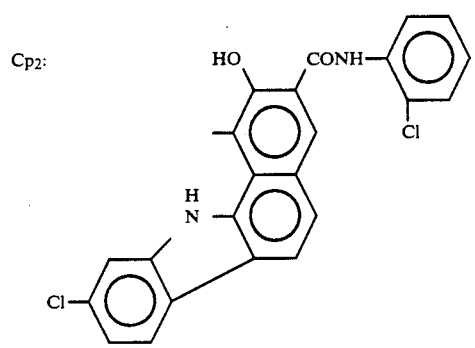
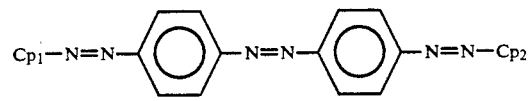
Pigment Example (40)
Cp₁, Cp₂:
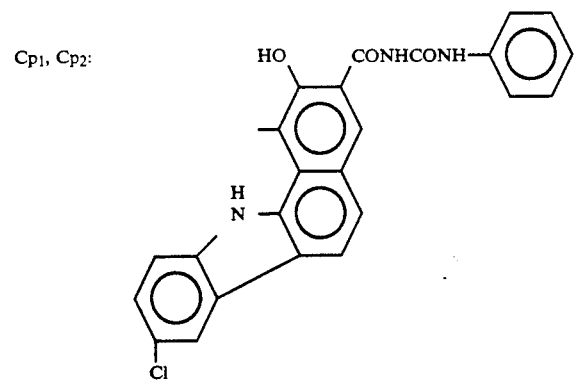
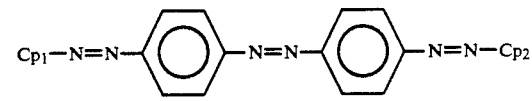
Pigment Example (41)

Cp₁, Cp₂:
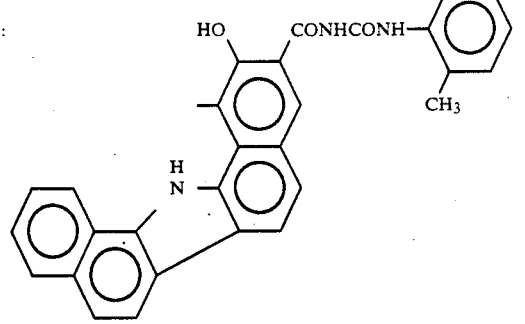
Pigment Example (42)
Cp₁, Cp₂:
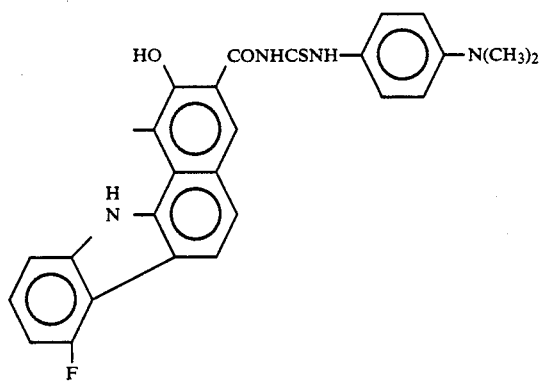
Pigment Example (43)
Cp₁, Cp₂:
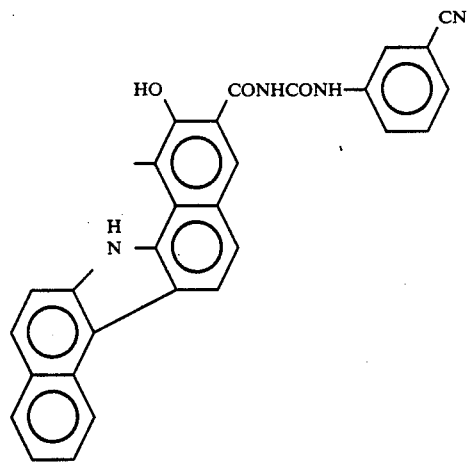
Pigment Example (44)

Cp₁, Cp₂:
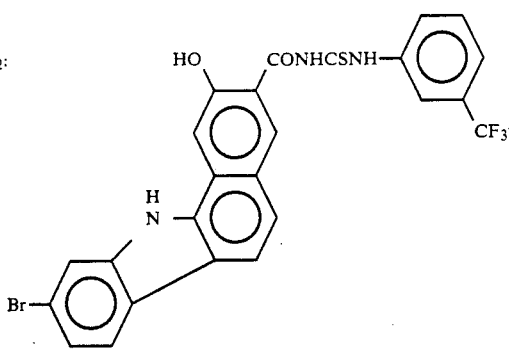
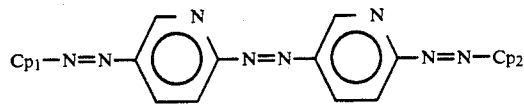
Pigment Example (45)
Cp₁, Cp₂:
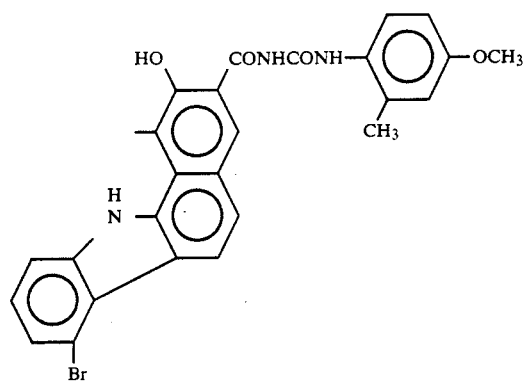
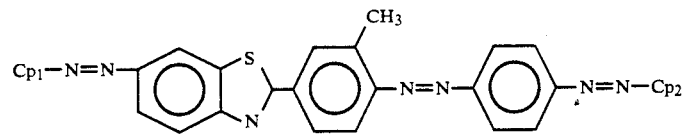
Pigment Example (46)
Cp₁, Cp₂:
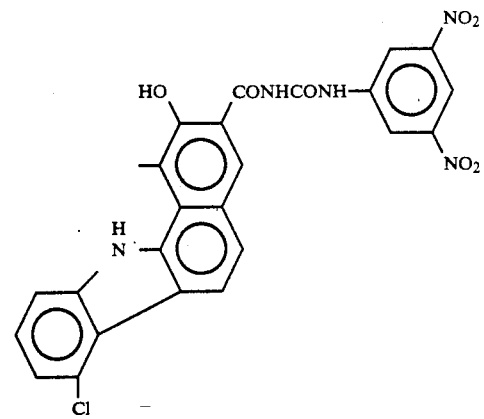
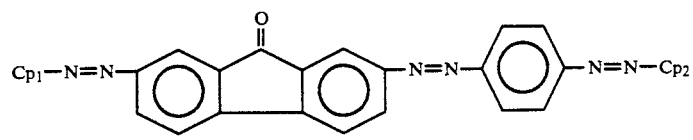
Pigment Example (47)

-continued
Cp₁, Cp₂:
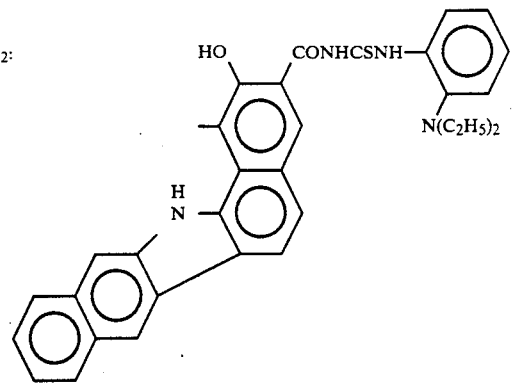
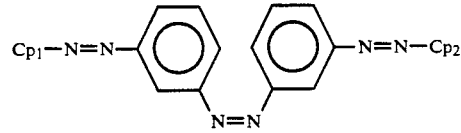
Pigment Example (48)
Cp₁, Cp₂:
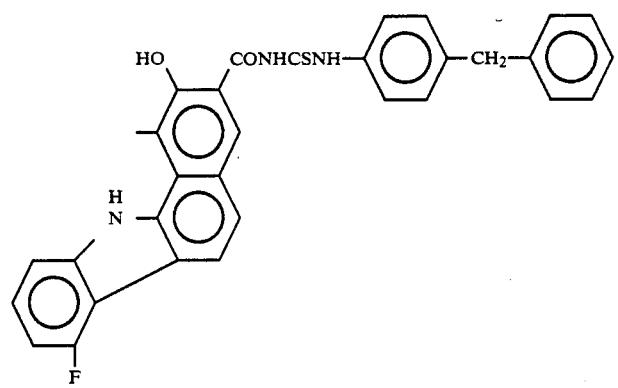
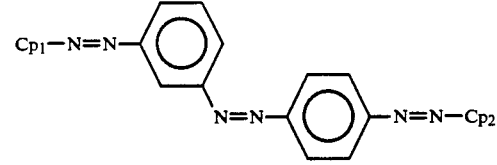
Pigment Example (49)
Cp₁:
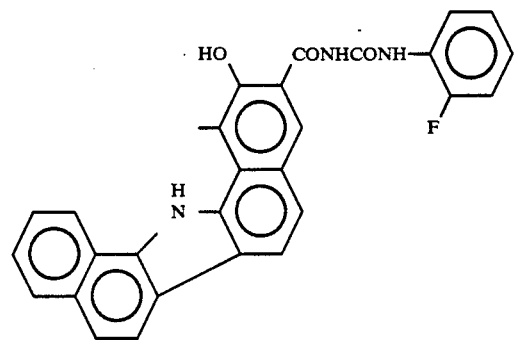

Cp2:
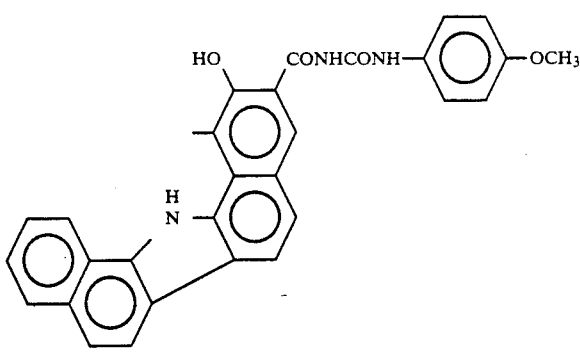
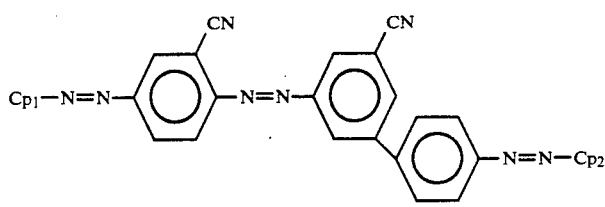
Pigment Example (50)
Cp1, Cp2:
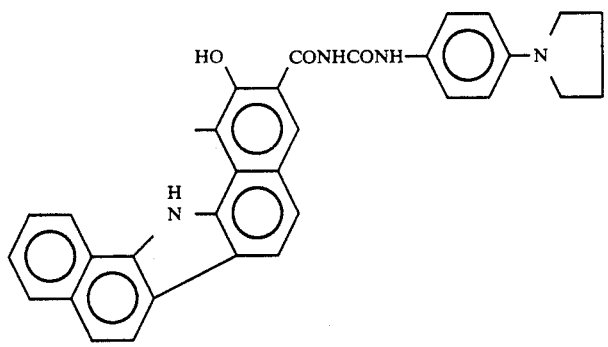
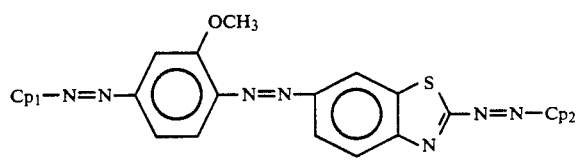
Pigment Example (51)
Cp1, Cp2:
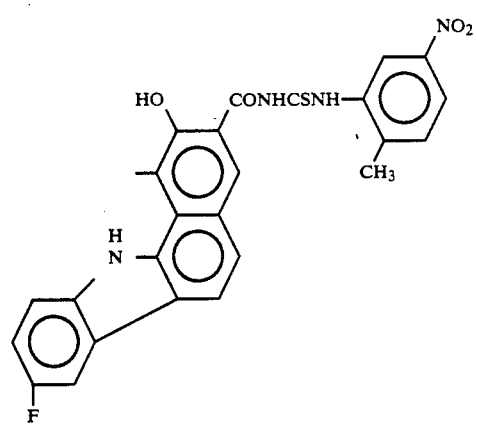
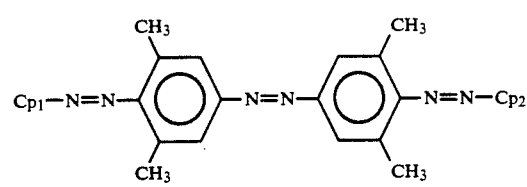
Pigment Example (52)

Cp₁, Cp₂:
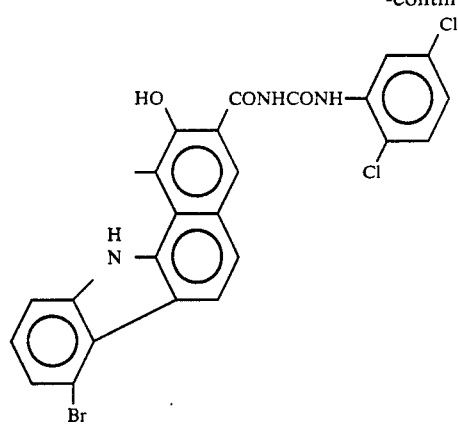
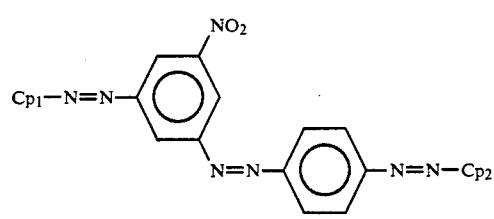
Cp₁, Cp₂:
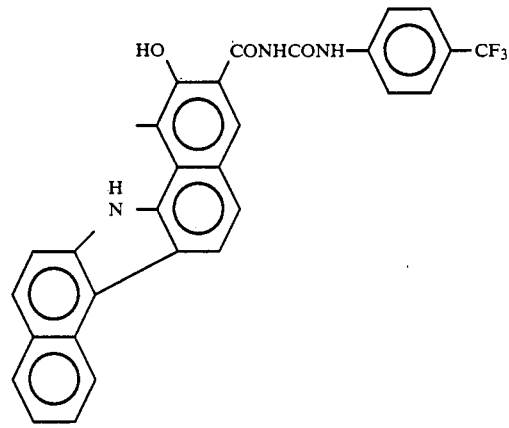
Pigment Example (53)
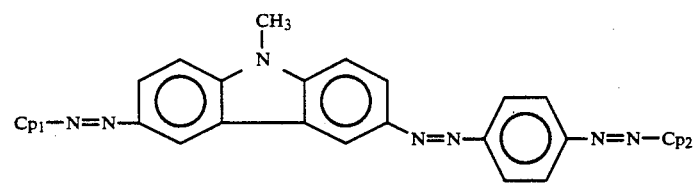
Cp₁, Cp₂:
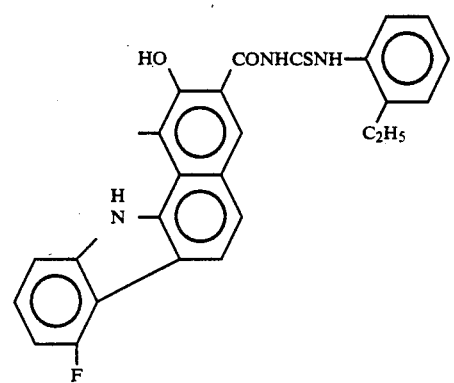
Pigment Example (54)

Pigment Example (55)
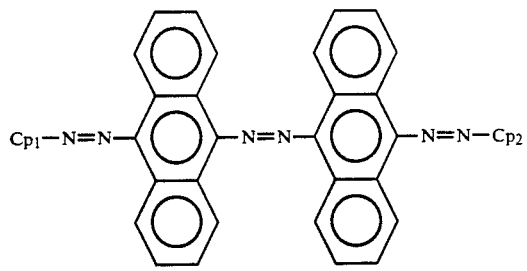
Cp₁:
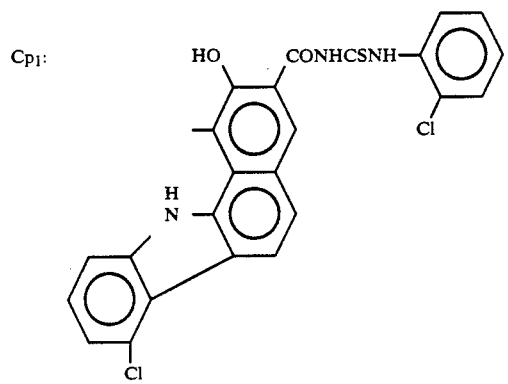
Cp₂:
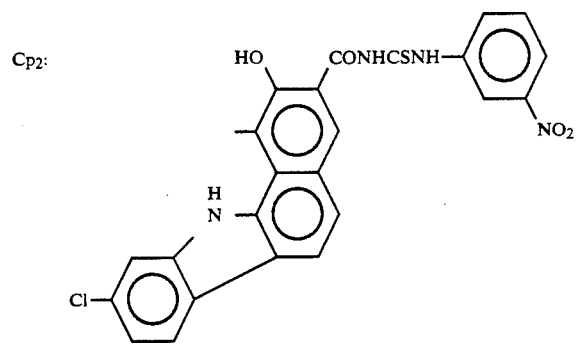
Pigment Example (56)
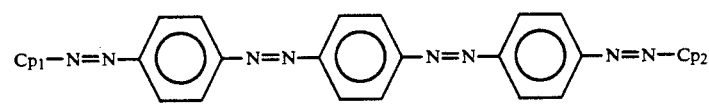
Cp₁, Cp₂:
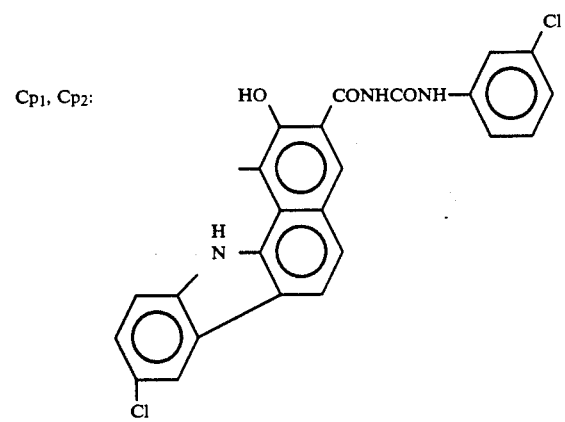
Pigment Example (57)
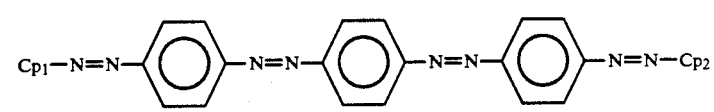

Cp₁, Cp₂:
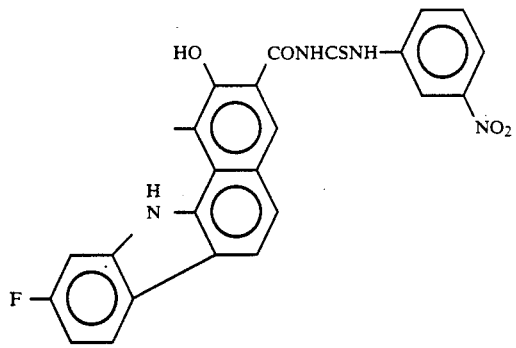
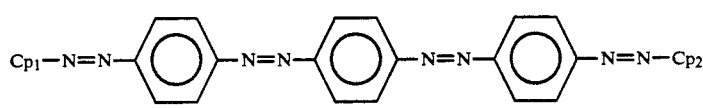
Pigment Example (58)
Cp₁, Cp₂:
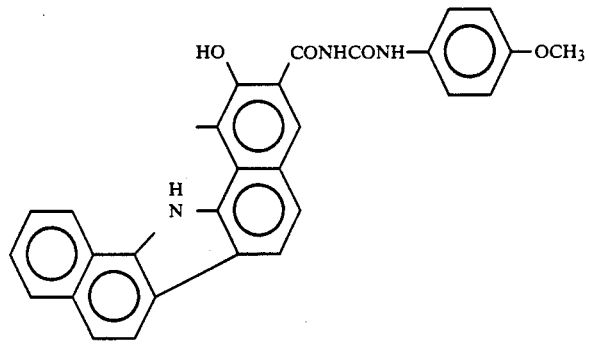
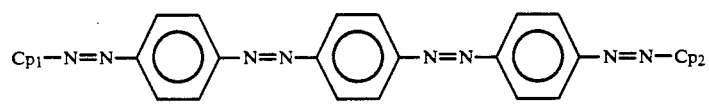
Pigment Example (59)
Cp₁, Cp₂:
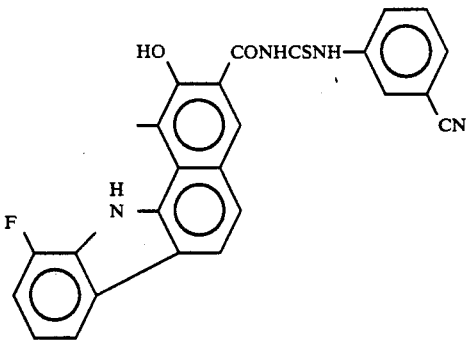
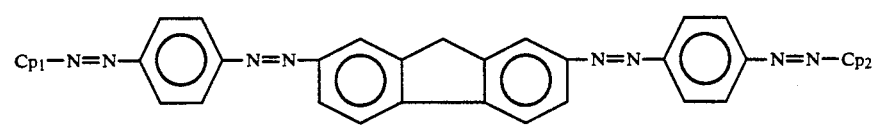
Pigment Example (60)

-continued
Cp₁, Cp₂:
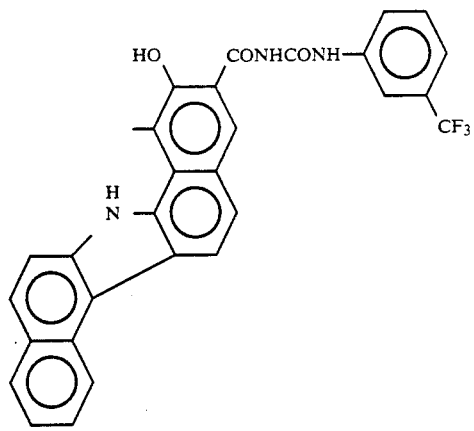
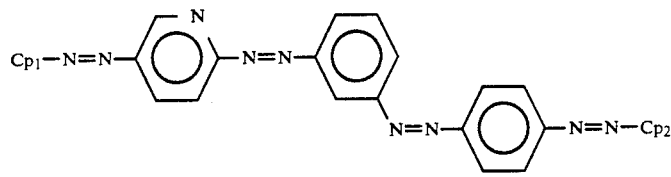
Pigment Example (61)
Cp₁, Cp₂:
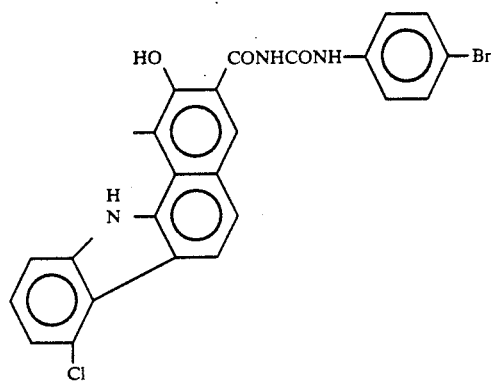
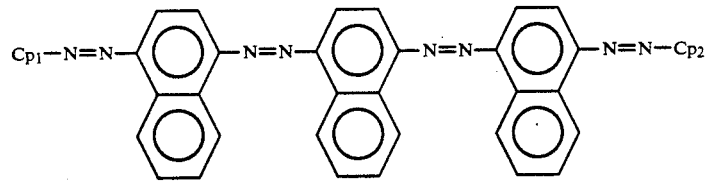
Pigment Example (62)
Cp₁, Cp₂:
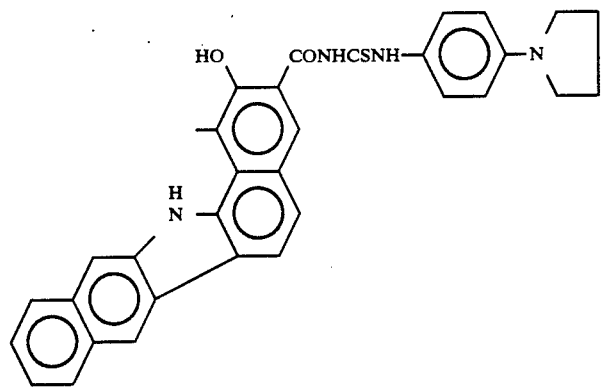

-continued
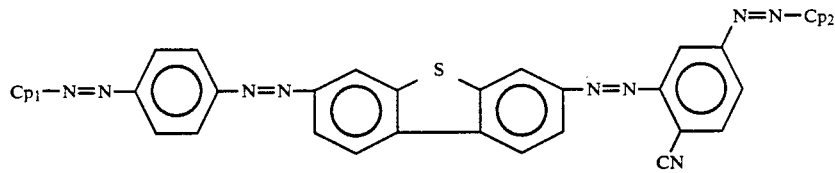
Pigment Example (63)
Cp1, Cp2:
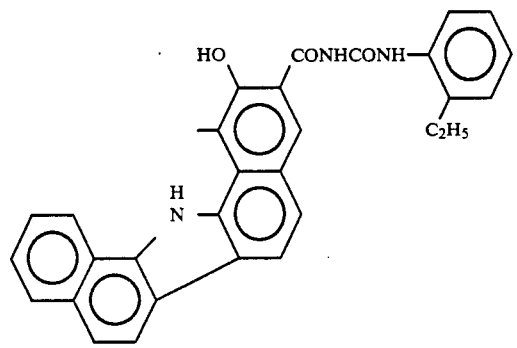
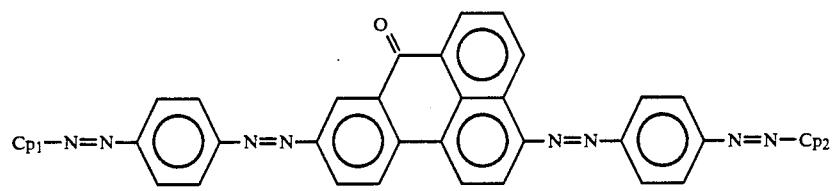
Pigment Example (64)
Cp1, Cp2:
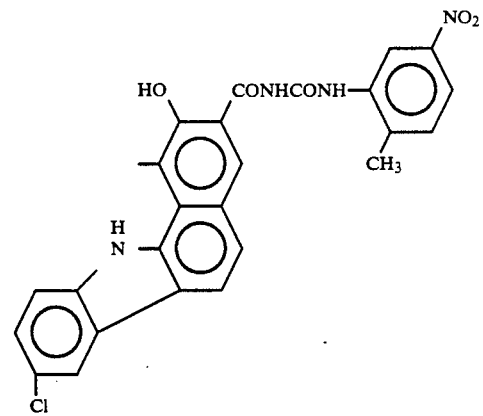
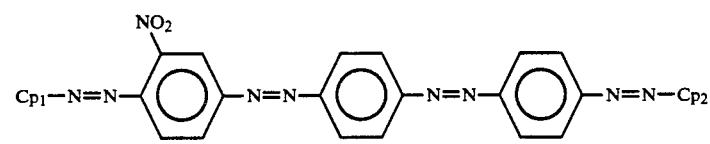
Pigment Example (65)

Cp₁, Cp₂:
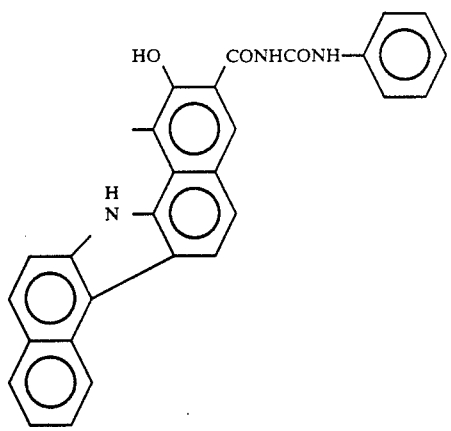
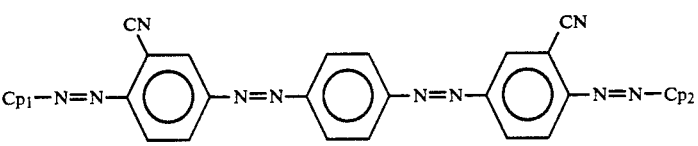
Pigment Example (66)
Cp₁, Cp₂:
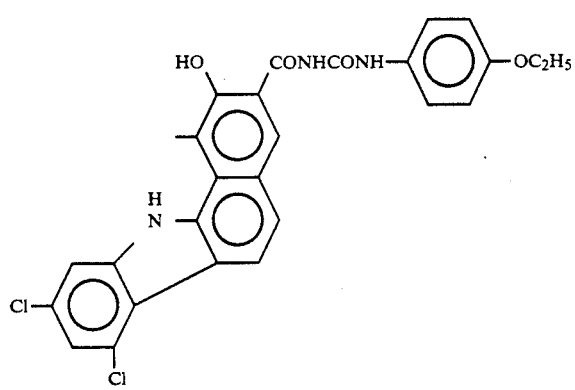
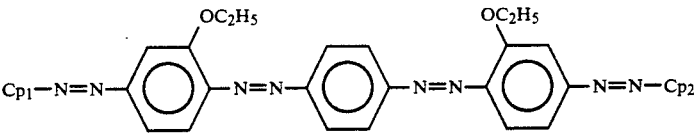
Pigment Example (67)
Cp₁, Cp₂:
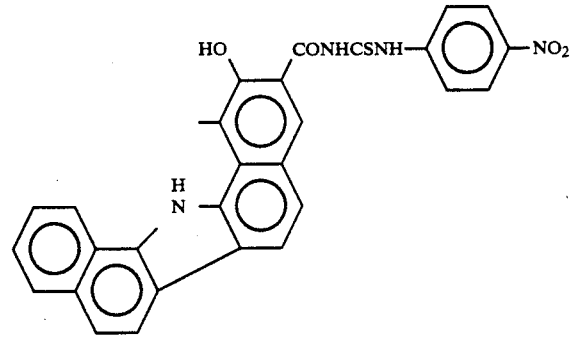
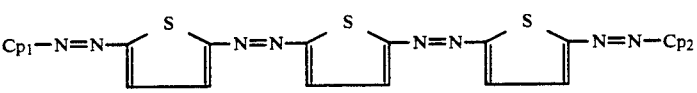
Pigment Example (68)

Cp₁, Cp₂:
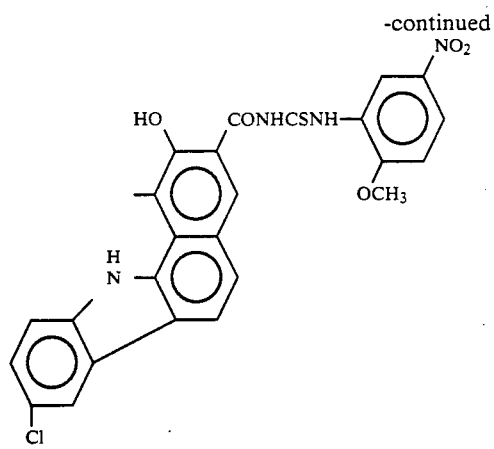
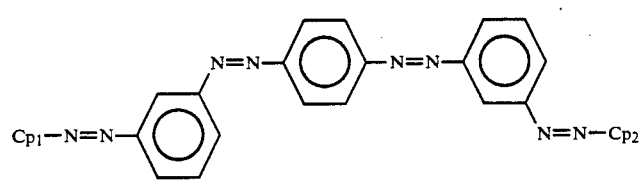
Cp₁, Cp₂:
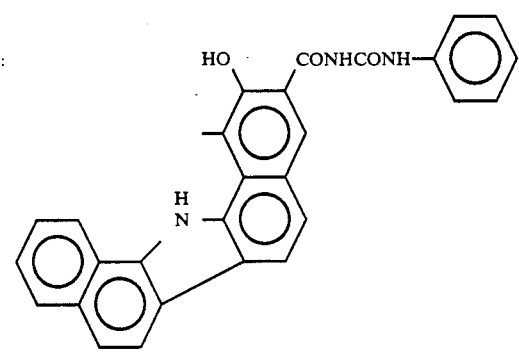
Pigment Example (69)
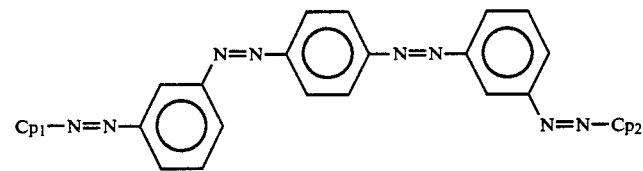
Cp₁, Cp₂:
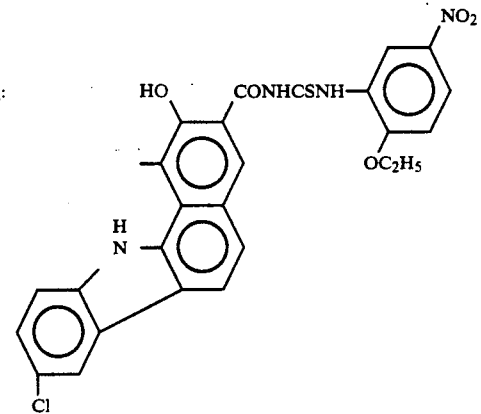
Pigment Example (70)

-continued
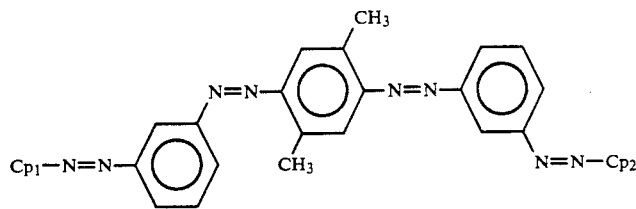
Pigment Example (71)
Cp₁, Cp₂:
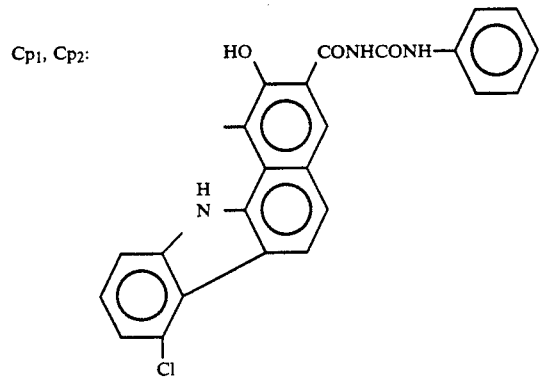
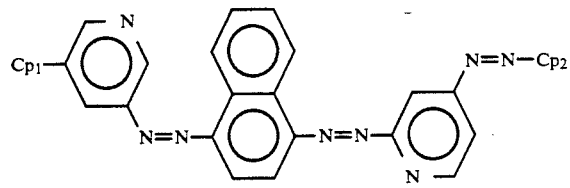
Pigment Example (72)
Cp₁, Cp₂:
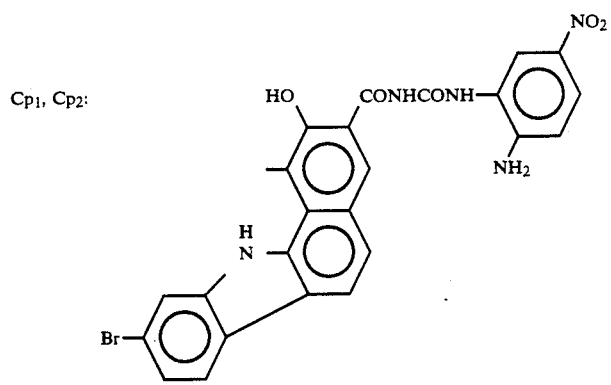
Pigment Example (73)
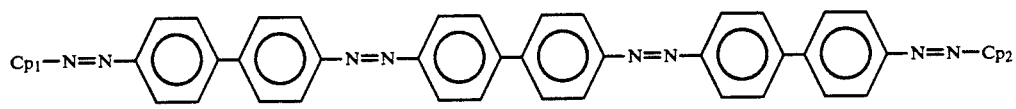

-continued
Cp₁, Cp₂: 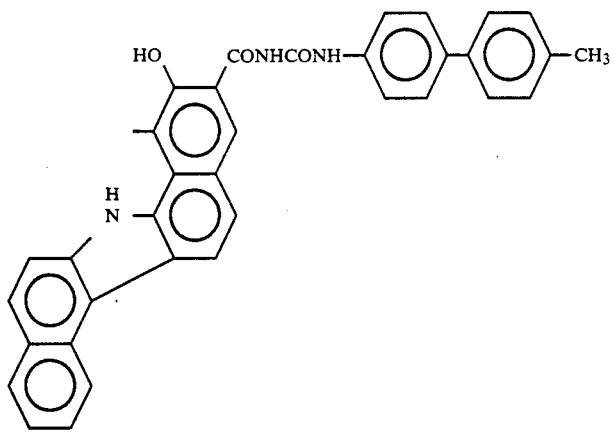
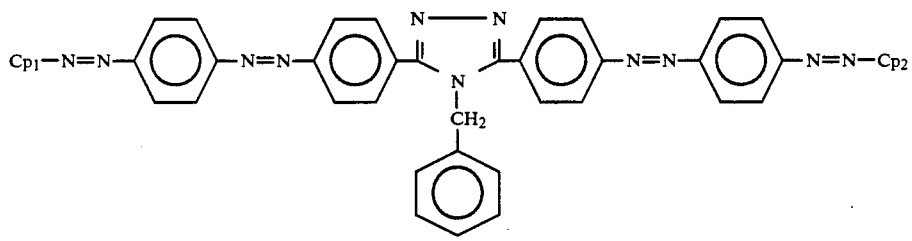
Pigment Example (74)
Cp₁, Cp₂: 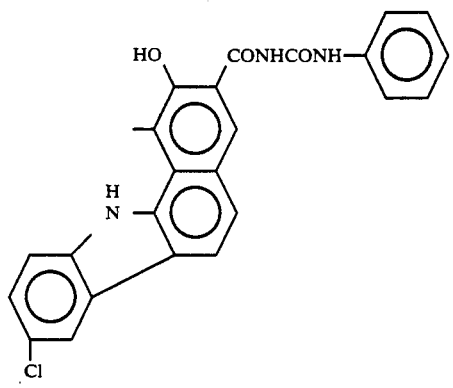
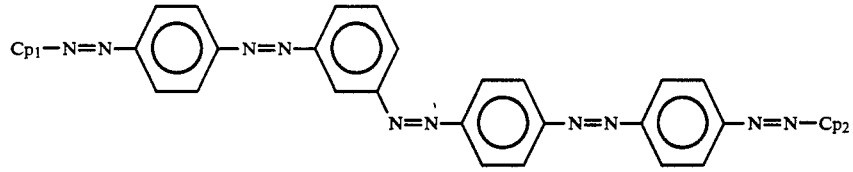
Pigment Example (75)
Cp₁, Cp₂: 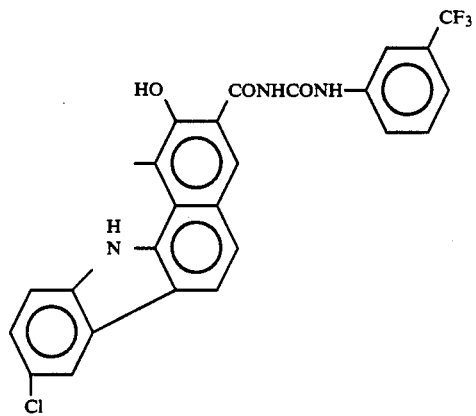

-continued
Pigment Example (76)
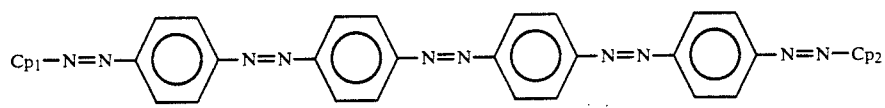
Cp₁, Cp₂:
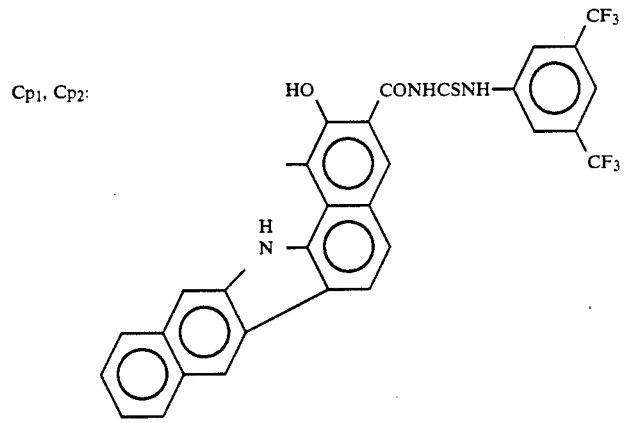
Pigment Example (77)
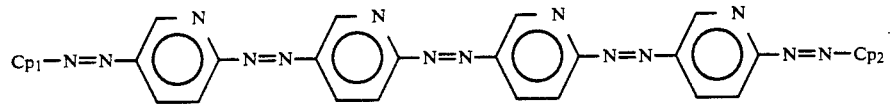
Cp₁, Cp₂:
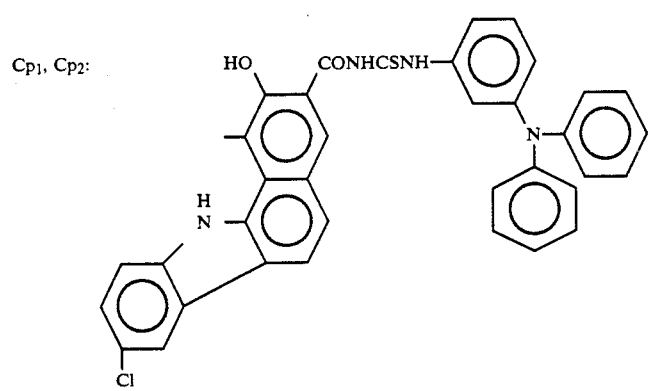
Pigment Example (78)
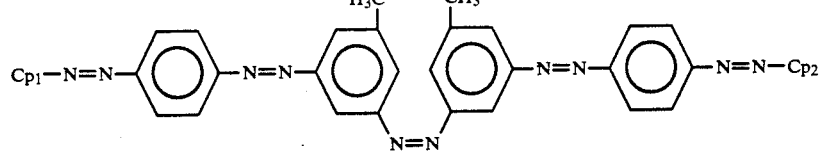
Cp₁, Cp₂:
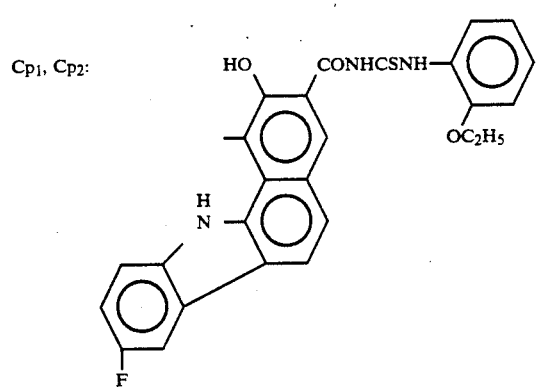

-continued
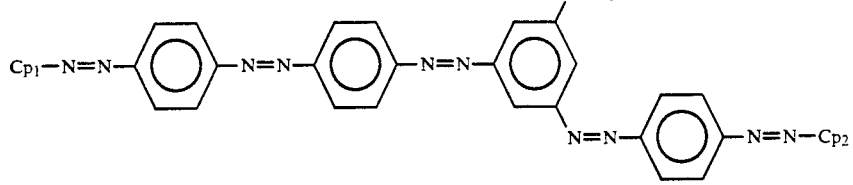
Pigment Example (79)
Cp₁, Cp₂:
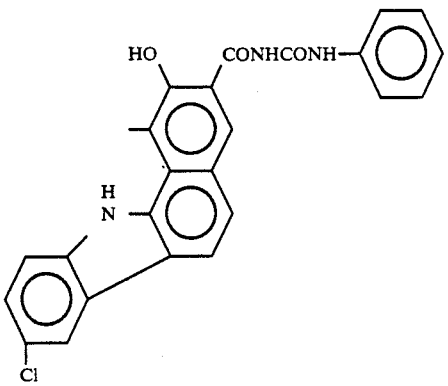
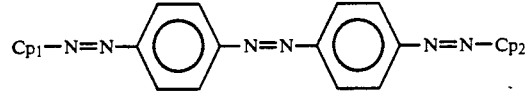
Pigment Example (80)
Cp₁, Cp₂:
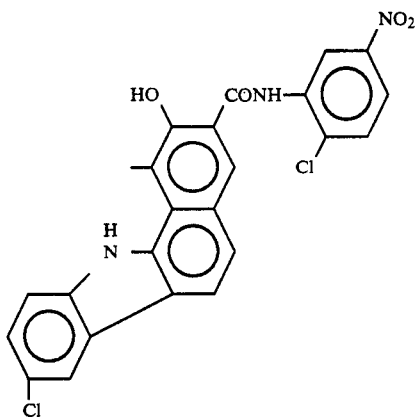
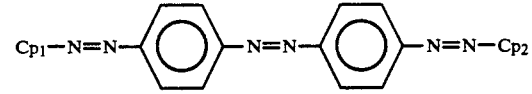
Pigment Example (81)
Cp₁, Cp₂:
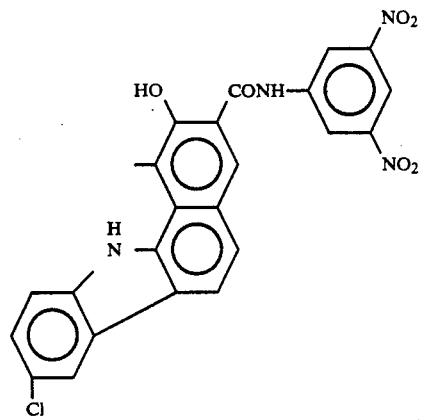

-continued
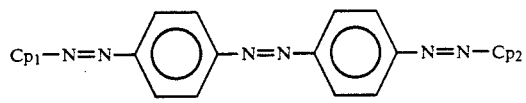
Cp₁, Cp₂:
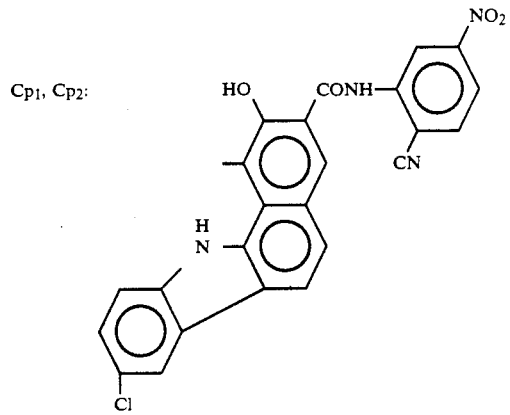
Pigment Example (82)
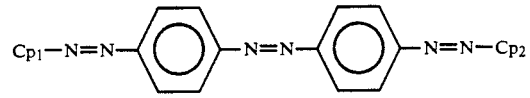
Cp₁, Cp₂:
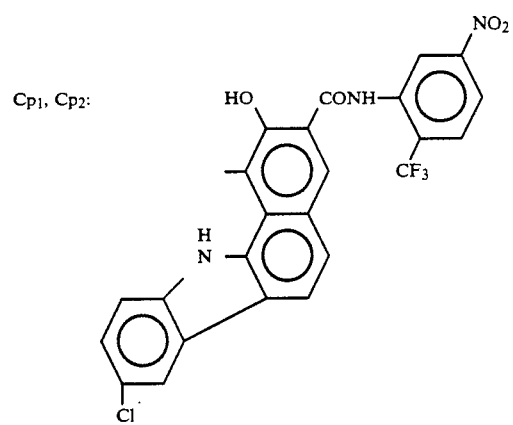
Pigment Example (83)
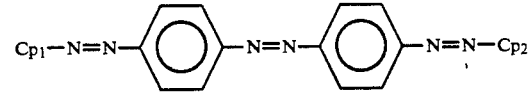
Cp₁, Cp₂:
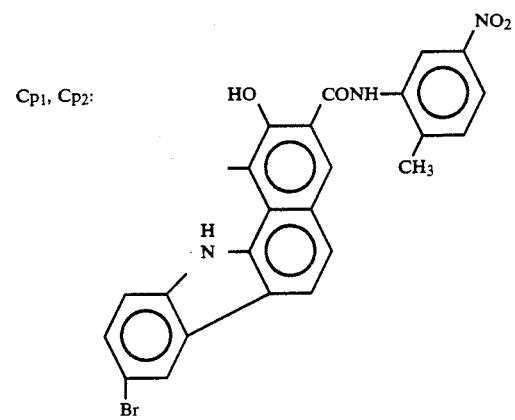
Pigment Example (84)

-continued
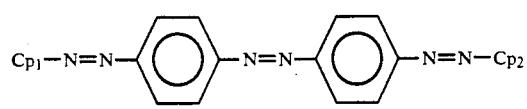
Cp₁, Cp₂:
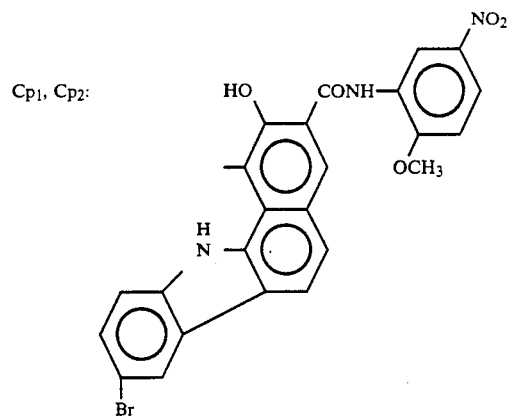
Pigment Example (85)
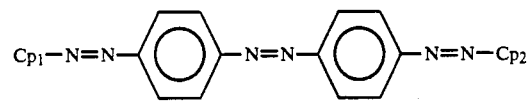
Cp₁, Cp₂:
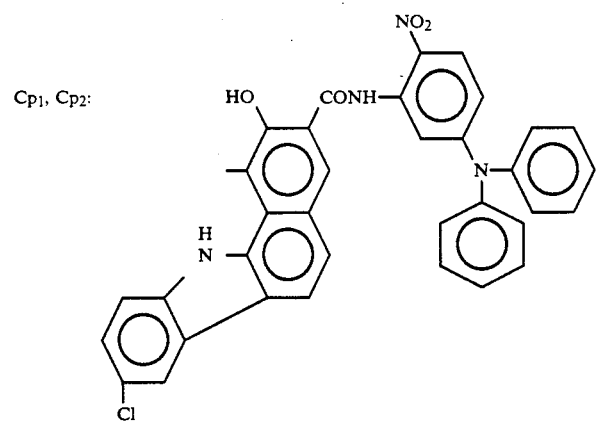
Pigment Example (86)
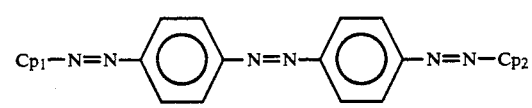
Cp₁:
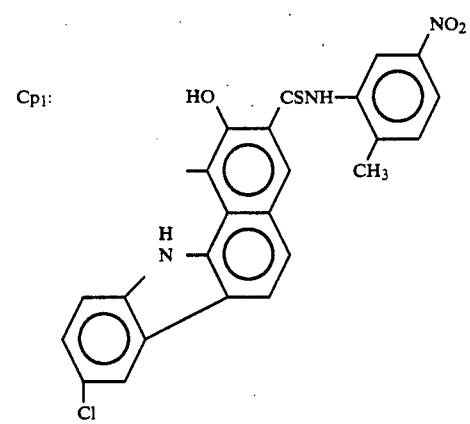
Pigment Example (87)

-continued
Cp2: 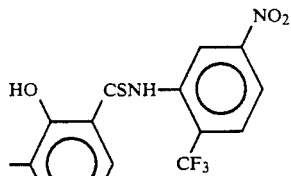
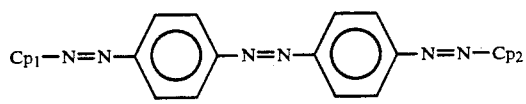
Cp1, Cp2: 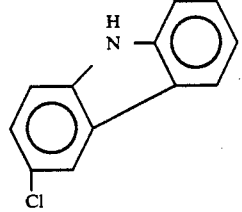
Pigment Example (88).
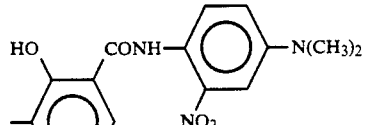
Cp1, Cp2: 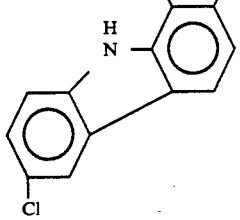
Pigment Example (89)
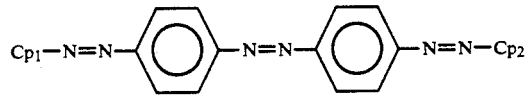
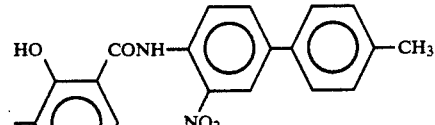
Pigment Example (90)
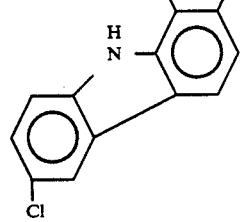
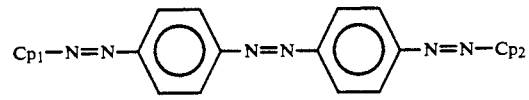

-continued
Cp₁, Cp₂:
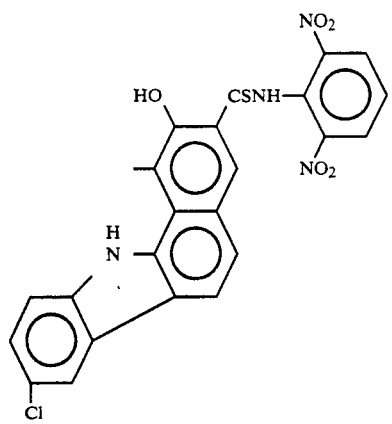
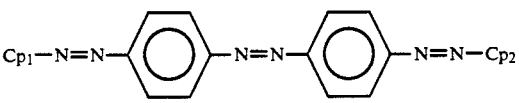
Pigment Example (91)
Cp₁, Cp₂:
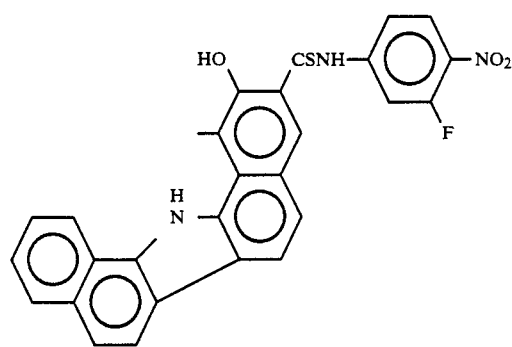
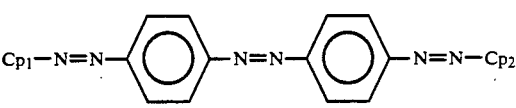
Pigment Example (92)
Cp₁, Cp₂:
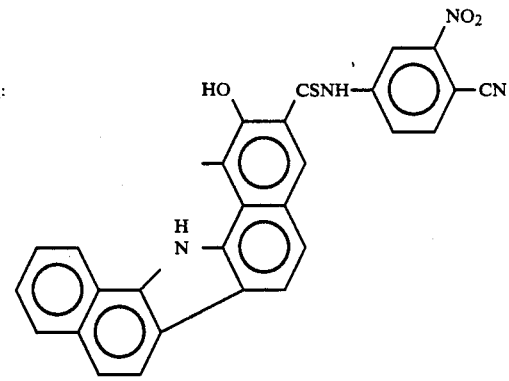
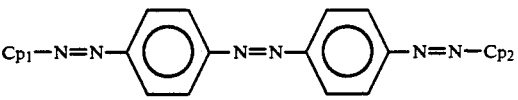
Pigment Example (93)

Cp₁, Cp₂:
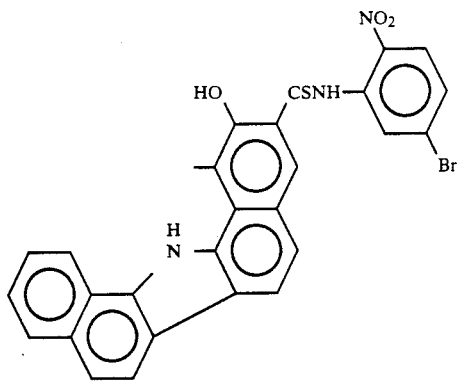
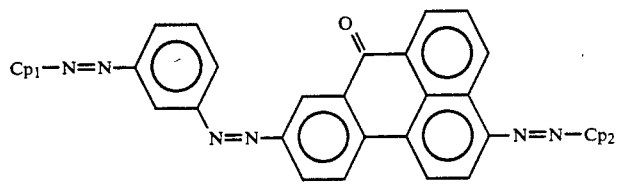
Pigment Example (94)
Cp₁, Cp₂:
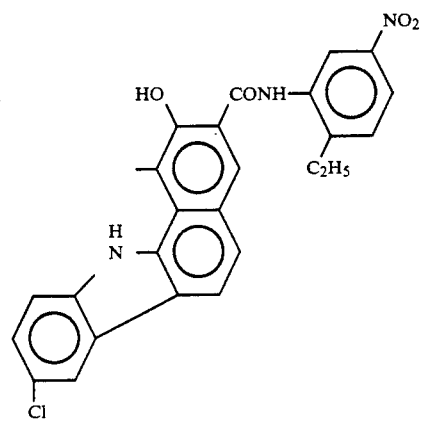
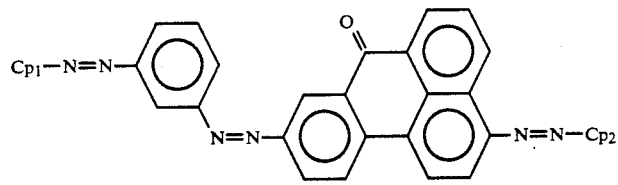
Pigment Example (95)
Cp₁, Cp₂:
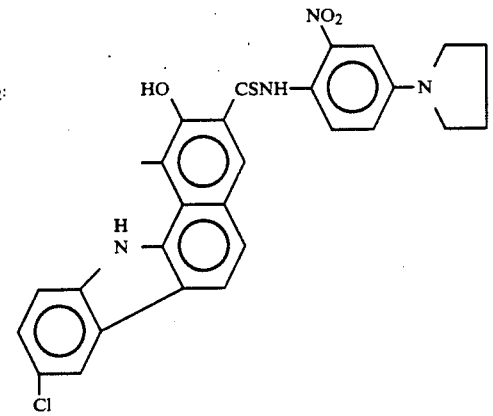

-continued
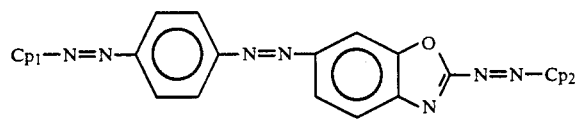
Cp₁, Cp₂:
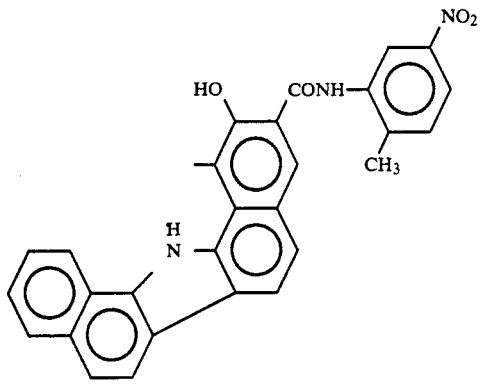
Pigment Example (96)
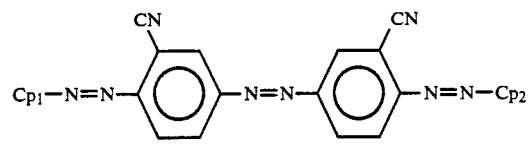
Cp₁, Cp₂:
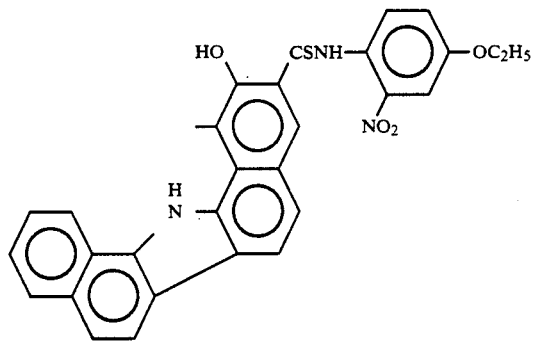
Pigment Example (97)
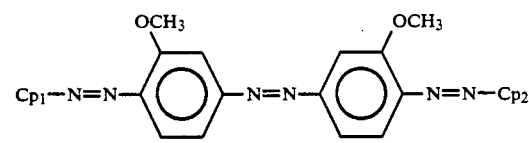
Cp₁, Cp₂:
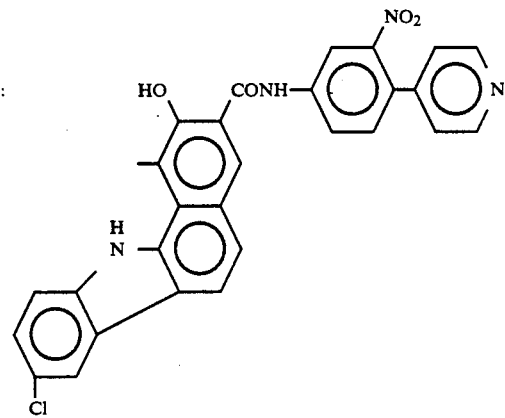
Pigment Example (98)

-continued
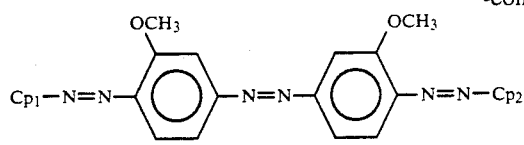
Pigment Example (99)
Cp₁, Cp₂:
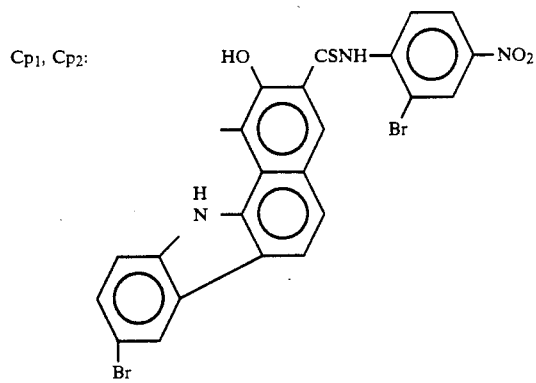
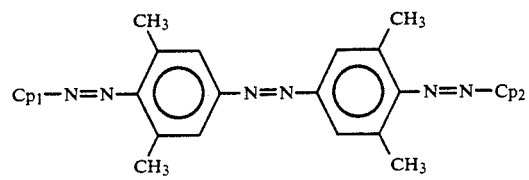
Pigment Example (100)
Cp₁, Cp₂:
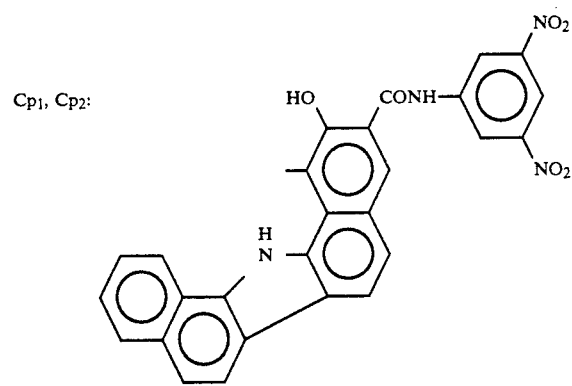
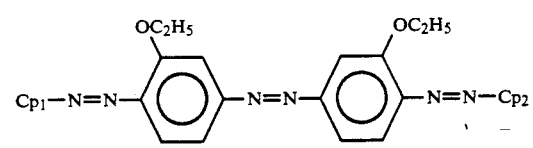
Pigment Example (101)
Cp₁, Cp₂:
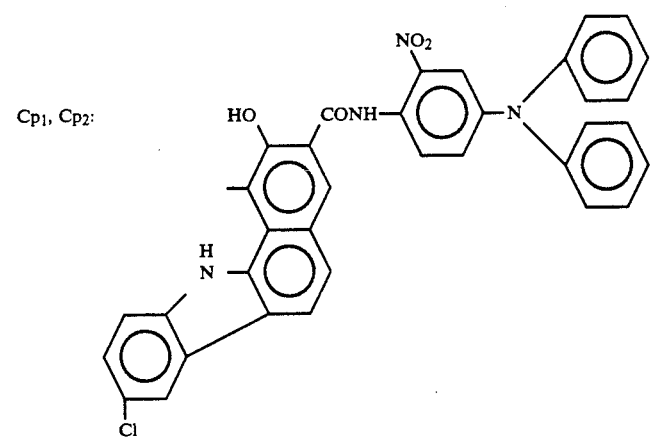

Pigment Example (102)
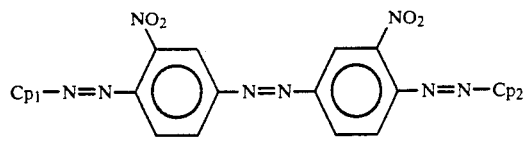
Cp₁, Cp₂:
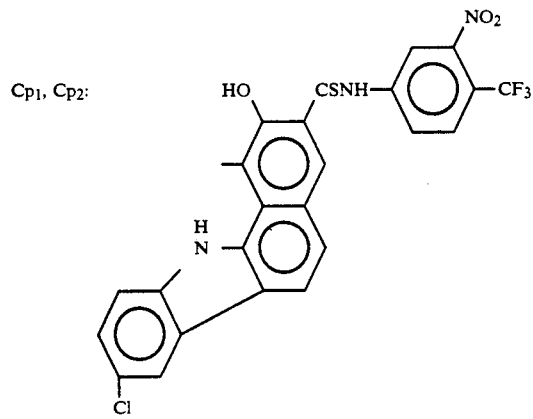
Pigment Example (103)
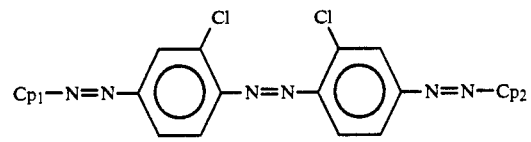
Cp₁, Cp₂:
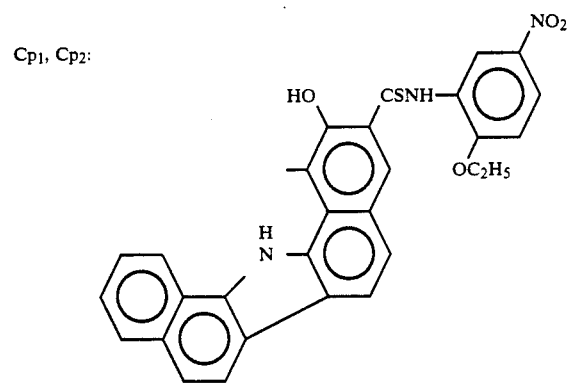
Pigment Example (104)
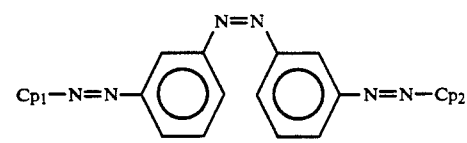
Cp₁, Cp₂:
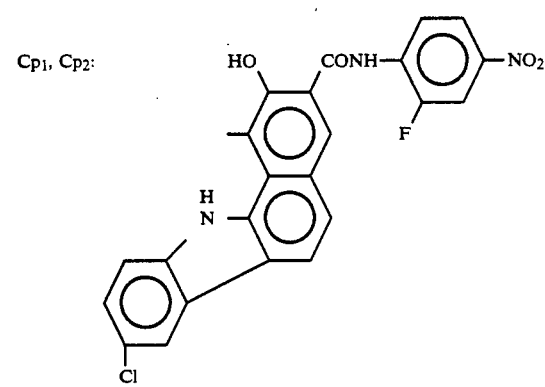

-continued
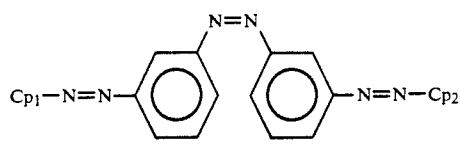
Pigment Example (105)
Cp₁, Cp₂:
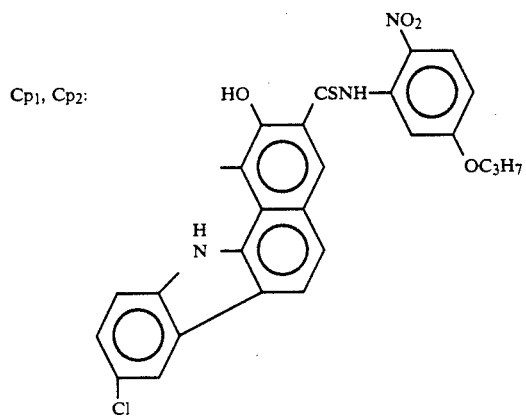
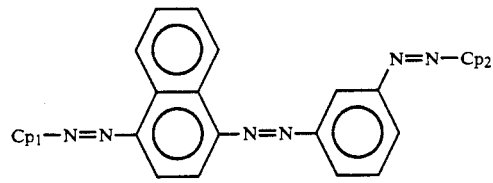
Pigment Example (106)
Cp₁, Cp₂:
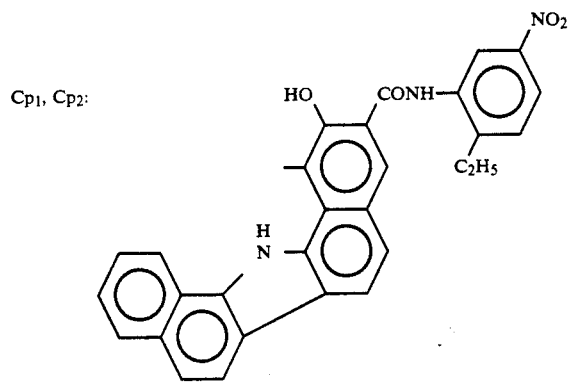
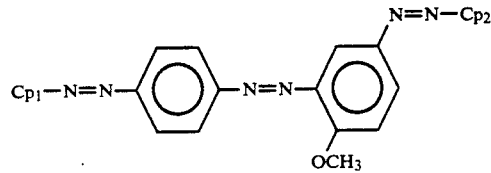
Pigment Example (107)

-continued
Cp₁, Cp₂: 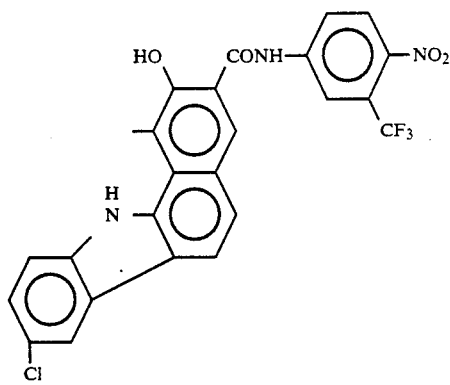
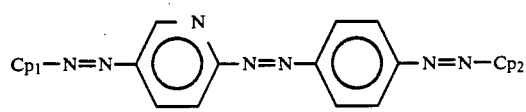
Pigment Example (108)
Cp₁, Cp₂: 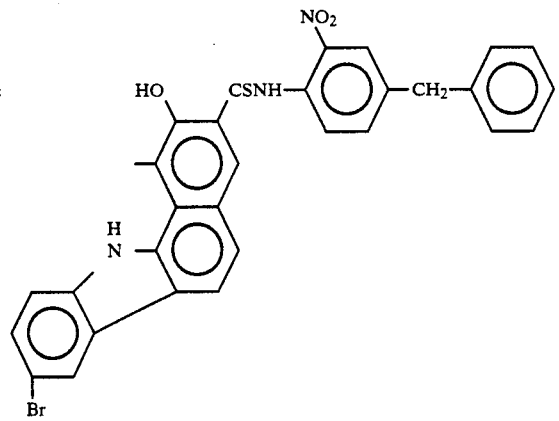
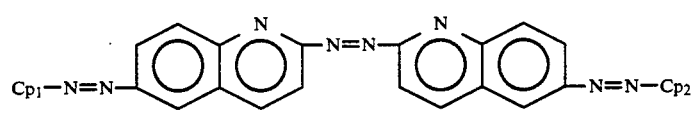
Pigment Example (109)
Cp₁, Cp₂: 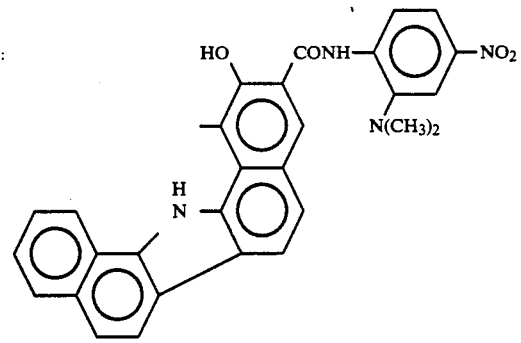
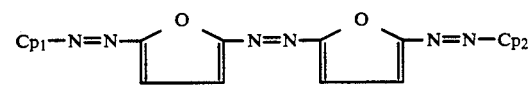
Pigment Example (110)

Cp₁, Cp₂:

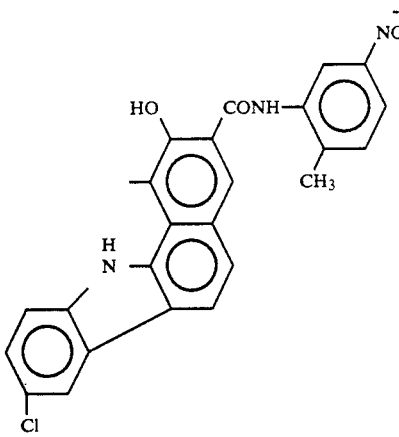

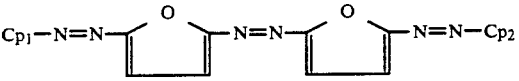

Cp₁:

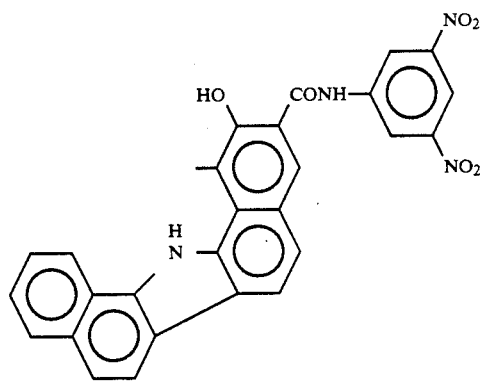

Cp₂:

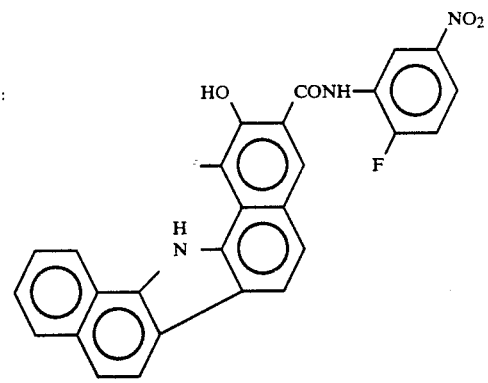

The azo pigment used in the present invention can easily synthesized by changing a diamine into a tetrazo compound by a normal method and then coupling the tetrazo compound to a coupler in an aqueous solution in the presence of an alkali. Alternatively, the azo pigment can be formed by converting a tetrazonium salt into a boro-fluoride salt or a zinc chloride complex salt, and then coupling it to a coupler in an organic solvent such as N,N-dimethylformamide or dimethylsulfoxide, in the presence of a base such as sodium acetate, triethylamine and N-methylmorpholine.

Synthesis Example 1 (Synthesis of Example 1 of Pigment)

A 500 ml beaker was charged with 9.49 g (0.03 mol) of

Pigment Example (111)

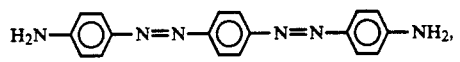

13.24 ml (0.150 mol) of thick hydrochloric acid and 102 ml of water. The mixture was stirred and cooled down to 4° C. Then, a liquid formed by dissolving 4.35 g (0.0630 mol) of sodium nitrite in 13 ml of water was dripped into the cooled mixture over 5 minutes. Then, the mixture was stirred for 30 minutes while the mixture temperature was maintained between 4 and 7° C. The mixture was then subjected to a carbon treatment followed by a filtration. To this mixture was added a liquid formed by dissolving 10.5 g (0.096 mol) of sodium borofluoride in 90 ml of water. The mixture was stirred and precipitated borofluoride salt was filtered and rinsed with cold water. The mixture was further scrubbed with acetonitrile, followed by drying at room temperature under a reduced pressure. The yield was 12.80 g and the yield ratio was 83%.

Subsequently, 500 ml of N,N-dimethylformamide (DMF) was charged in a 1000 cc beaker, and a compound expressed by the following formula was dissolved in an amount of 17.17 g (0.042 mol).

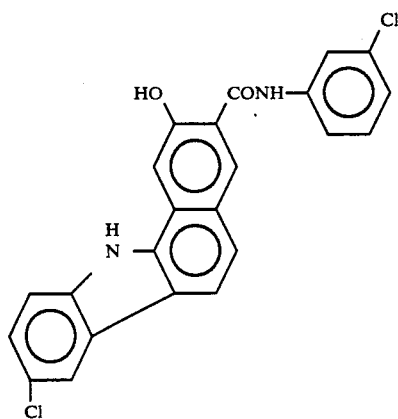

The solution was cooled to 5° C., and 10.28 g (0.020 mol) of the boro-fluoride salt mentioned before was dissolved in this solution, and 5.1 g (0.050 mol) of triethylamine was dripped in 5 minutes. After stirring for 2-hours, precipitated pigment was filtered and scrubbed, and rinsed 4 times with DMF and 3 times with water, followed by freeze-drying. The yield and the yield ratio were 18.28 g and 79%, respectively. The result of an element analysis is shown in the following table.

|   | Calculated value (%) | Measured value (%) |
|---|---|---|
| C | 64.36 | 64.35 |
| H | 3.32 | 3.34 |
| N | 14.53 | 14.50 |

Synthesis Example 2 (Synthesis of Example 40 of Pigment)

A tetrazo compound was formed by the same process as Example 1 except that 6/37 g (0.030 mol) of 4,4'-diaminobenzene was substituted for the compound

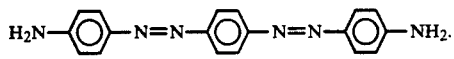

The yield and the yield ratio were 8.49 g and 83%, respectively.

Subsequently, 500 ml of N,N-dimethylformamide (DMF) was charged in a 1000 cc beaker, and a compound expressed by the following formula was dissolved in an amount of 18.02 g (0.042 mol).

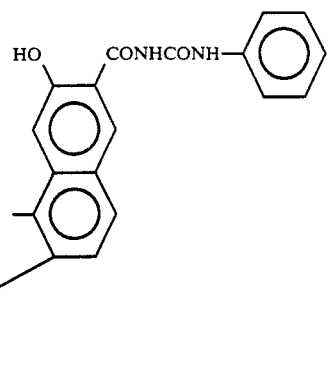

The solution was cooled to 5° C., and 6.76 g (0.20 mol) of boro-fluoride salt mentioned above was dissolved in this solution, and 5.1 g (0.050 mol) of triethylamine was dripped over 5 minutes. After stirring for 2-hour, precipitated pigment was filtered and scrubbed, and rinsed 4 times with DMF and 3 times with water, followed by freeze-drying. The yield and the yield ratio were 18.28 g and 79%, respectively. The result of an element analysis is shown in the following table.

|   | Calculated value (%) | Measured value (%) |
|---|---|---|
| C | 65.10 | 65.19 |
| H | 3.59 | 3.57 |
| N | 15.71 | 15.72 |

Synthesis Example 3 (Synthesis of Example 84 of Pigment)

Tetrazo was formed by the same process as Example 2 to obtain a boro-fluoride salt. The yield and the yield ratio were 8.51 g and 84%, respectively.

Subsequently, 500 ml of N,N-dimethylformamide (DMF) was charged in a 1000 cc beaker, and a compound expressed by the following formula was dissolved in an amount of 18.73 g (0 042 mol).

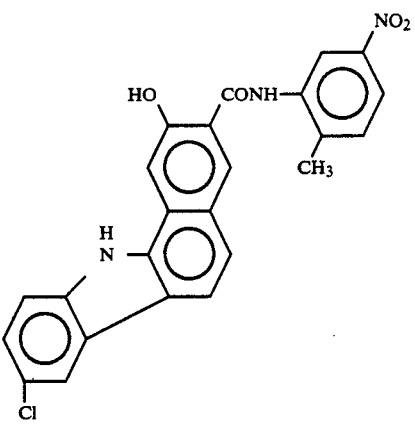

The solution was cooled to 5°, and 6 g (0.020 mol) of the boro-fluoride salt mentioned above was dissolved in this solution, and 5.1 g (0.050 mol) of triethylamine was dripped over 5 minutes. After stirring for 2-hour, precipitated pigment was filtered and scrubbed, and rinsed 4 times with DMF and 3 times with water, followed by freeze-drying. The yield and the yield ratio were 36.89 g and 78%, respectively. The result of an element analysis is shown in the following table:

|   | Calculated value (%) | Measured value (%) |
|---|---|---|
| C | 60.20 | 59.98 |
| H | 3.21 | 3.25 |
| N | 14.05 | 14.01 |

The electrophotographic photosensitive member in accordance with the present invention has a conductive substrate and a photosensitive layers containing an azo compound expressed by the formula (1).

The photosensitive layer can have any desired form, although it is preferred to use a so-called function-separation type photosensitive layer composed of a charge generating layer containing an azo pigment of the formula (1) and a charge transporting layer containing a charge transporting substance laminated on the charge generating layer.

The charge generating layer can be formed by preparing a coating solution by dispersing the above-mentioned azo pigment in a suitable solvent together with a binder resin, and applying the coating solution to the surface of the conductive substrate by a known method. Preferably, the charge generating layer has a thickness of 5 $\mu$m or below, more preferably 0.1 to 1.3 $\mu$m.

The azo pigment of the formula (1) suitably used in the present invention may be in a crystalline state or amorphous state. Two or more azo pigments expressed by the formula (1) may be used in combination as desired. It is also possible to use one- two or more of the azo pigments in combination with another known charge generating substance which is known.

The binder resin may be selected from various insulating resins and organic photoconductive polymers. Examples of the binder resin preferably used are polyvinylbutyral, polyvinylbenzal, polyallylate, polycarbonate, polyester, phenoxy resin, cellulose resin, acrylic resin an polyurethane. The content of the binder resin in the charge generating layer should be 80 wt % or less, preferably 55 wt % or less.

Preferably, the solvent used in dispersing the azo pigment is selected from substances which dissolve the above-mentioned resins but do not dissolve substances forming the charge transporting layer and undercoat layer, discussed below.

Examples of the solvent suitably used are ethers such as tetrahydrofuran and 1,4-dioxane, ketones such as cyclohexanone and methylethylketone, amides such as N,N-dimethylformamide, esters such as methyl acetate and ethyl acetate, aromatic compounds such as toluene, xylene and chlorobenzene, alcohols such as methanol, ethanol and 2-propanol, and aliphatic halides of hydrocarbons such as chloroform, methylene chloride, dichloroethylene, carbon tetrachloride and trichloroethylene.

The charge transporting layer is formed on the outer or inner surface of the charge generating layer. This layer has a function to receive charge carriers from the charge generating layer under the influence of an electric field and to transport the charge carriers.

The charge transporting layer is formed by dissolving a charge transporting substance in a solvent together with a binding resin so as to form a coating solution, and then applying the coating solution. The thickness of the charge transporting layer preferably ranges between 5 and 40 $\mu$m, more preferably between 15 and 30 $\mu$m.

There are two types of charge transporting substances: namely, electron transporting substances and hole transporting substances. Examples of the electron transporting substances are electron-attracting substances such as 2,4,7-trinitrofluorenone, 2,4,5,7-tetranitrofluorenone, chloranyl and tetracyanoquinodimethane, and substances formed by polymerizing these substances.

Examples of the hole transporting substances are polycyclic aromatic compounds such as pyrene and anthracene, heterocyclic compounds such as carbazole, indole, imidazole, oxazole, thiazole, oxadiazole, pyrazole, pyrazoline, thiadiazole and triazole, hydrazone compounds such as p-diethylaminobenzaldehyde-N,N-diphenylhydrazone and N,N-diphenylhydrazino-3-methylidene-9-ethylcarbazole, styryl compounds such as $\alpha$-phenyl-4'-N,N-diphenylaminostilbene, 5-[4-(di-p-tolylamino)benzylidene]-5H-dibenzo [a,d]cycloheptene, benzidine compounds, triallylmethane compounds, triphenylamine and polymers having groups of these compounds in principal or side chain, e.g., poly-N-vinylcarbazole and polyvinylanthracene.

It is also possible to use, besides these organic charge transporting substances, inorganic materials such as selenium-tellurium, amorphous silicon and cadmium sulfide.

On, two or more of these charge transporting substances may be used in combination.

Examples of the binder resins are insulating resins such as acrylic resin, polyallylate, polyester, polycarbonate, polystyrene, acrylonitrile-styrene copolymer, polyacrylamide, polyamide and chlorinated rubber, and organic photoconductive polymers such as poly-N-vinylcarbazole and polyvinyl anthracene.

The electrophotographic photosensitive member of the present invention may also be of a type called a single-layered electrophotographic photosensitive member in which both an azo pigment shown by the formula (1) and a charge transporting substance are contained in a single layer. In such a case, a charge moving complex composed of poly-N-vinylcarbazole and trinitrofluorenone can be used as the charge transporting substance.

This type of electrophotographic photosensitive member can be produced by preparing a coating solution by dispersing the azo pigment and the charge moving complex in a resin solution and then applying this coating solution to a conductive substrate.

The conductive substrate in the electrophotographic photosensitive member of the present invention can suitably be formed from, for example, aluminum, aluminum alloy, copper, zinc, stainless steel, titanium, nickel, indium, gold and platinum. The conductive substrate also may be produced by forming a film of such a metal or ally by vacuum evaporation on a sheet of a plastic such as polyethylene, polypropylene, polyvinylchloride, polyethylene terephthalate or acrylic resin, or by applying conductive particles such as carbon black or silver applied to the surface of a metallic substrate by a suitable binder resin. It is also possible to use a substrate formed of a plastic or a paper impregnated with conductive particles.

According to the invention, an undercoating layer having a barrier function and a bonding function may be provided between the conductive substrate and the photosensitive layer.

The undercoat layer may be formed from a material such as casein, polyvinylalcohol, nitrocellulose, polyamide (nylon 6, nylon 66, nylon 610, copolymer nylon, alkoxymethylated nylon etc.), polyurethane and aluminum oxide. The thickness of the undercoating layer is 5 μm or less, preferably 5 to 3 μm.

The electrophotographic photosensitive member of the present invention also can have on the photosensitive layer a protective layer which is a resin layer or a resin layer having conductive particles.

The electrophotographic photosensitive member of the present invention can be used not only in electrophotographic copying apparatus but also in various commercially available electrophotographic devices such as laser beam printers, CRT printers, LED printers, liquid crystal printers and laser plate makers.

FIG. 1 schematically shows an ordinary transfer type electrophotographic apparatus incorporating an electrophotographic photosensitive member of the present invention.

The apparatus has a drum-type photosensitive member serving as an image carrier which rotatable about an axis 1a in the direction of an arrow, and rotates at a predetermined rate to provide a constant surface speed. During the rotation of the photosensitive member 1, the surface of the photosensitive member 1 is uniformly charged to a predetermined positive or negative potential by a charging device 2. Then, the portion of the surface of the photosensitive member 1 brought to a position adjacent an exposure unit 3 is exposed to image light L. The exposure is conducted through a slit or by means of a scanning laser beam. In consequence, electrostatic image corresponding to the image is progressively formed on the surface of the photosensitive member.

The portion of the surface of the photosensitive member is then brought to a position adjacent a developing unit 4 where the electrostatic latent image is developed into a visible image with a toner. The portion of the surface of the photosensitive member carrying the developed toner image is then brought to a position adjacent a transfer device 5 in which the toner image is progressively transferred to the surface of a transfer paper P which is fed into the SPACE between the photosensitive member 1 and the transfer device 5 in synchronization with rotation of the photosensitive member. The transfer paper P to which the image has been transferred is then separated from the surface of the photosensitive member and is delivered to a fixing device 8 in which the transferred image is fixed to the transfer paper P, and the transfer paper P carrying the image fixed thereto is ejected as a copy.

The surface of the photosensitive member 1 after the transfer of the image is then moved to a position adjacent to a cleaning device 6 in which residual toner particles are removed. The surface is then made to pass through a preexposure device 7 for removal of residual electrostatic charges, so as to become ready for the next image forming cycle.

Corona dischargers are commonly used as the charging device 2 for uniformly charging the surface of the photosensitive member 1. Similarly, corona type devices are commonly used as the transfer device 5. A plurality of components of the apparatus such as the photosensitive member 1, developing device 4 and the cleaning device 6 may be constructed in a unit which is detachably mounted on the remainder of the apparatus. For instance, the charging device, developing device and/or the cleaning device are constructed as a unit with the photosensitive member and this unit is detachably mounted in the apparatus through the use of a guide means such as a guide rails.

The image exposure light is the light reflected from or transmitted through an original when the electrophotographic apparatus is used as a copying apparatus or a printer. The exposure may also be effected by scanning with a laser beam or driving of an LED array or a liquid-crystal shutter array conducted in accordance with electric signals which are formed by reading the original.

Figure 2:
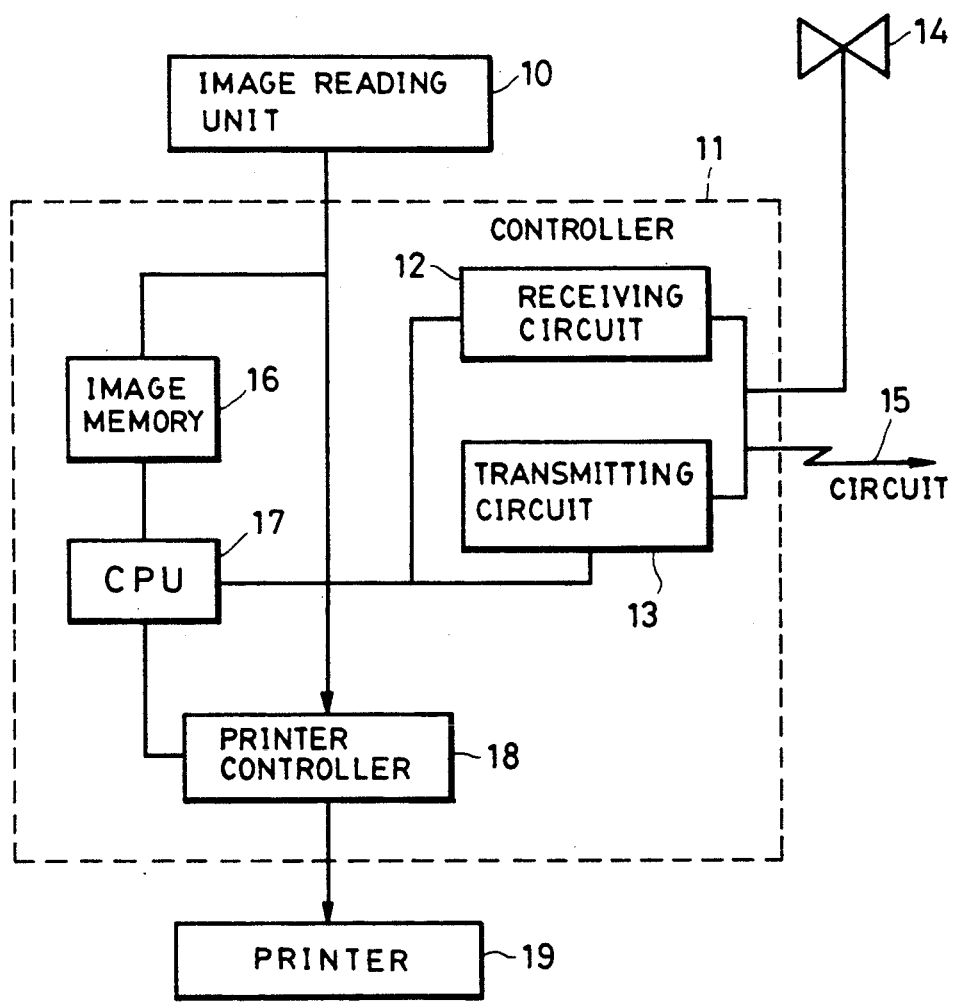
FIG. 2 is a block diagram of a facsimile having, as a printer, an electrophotographic apparatus which uses an electrophotographic photosensitive member in accordance with the present invention.

When the electrophotographic apparatus is used as a printer of a facsimile apparatus, the data received from a remote station controls the exposure light for printing. FIG. 2 is a block diagram of a facsimile system having such a printer.

A controller 11 controls an image reading unit 10 and a printer 19. The controller 11 operates under the control of a CPU 17. The read data delivered from the image reading unit is transmitted to an opposite station through a transmitting circuit 13. The data received from the opposite station is delivered to the printer 19 through the receiving circuit 12. An image memory stores predetermined image data. A printer controller 18 controls the operation of the printer 19. Numeral 14 denotes a telephone.

The image information received from a remote station through the circuit 15 is demodulated by the receiving circuit and is then decoded by the CPU 17. The decoded image data is successively stored in the image memory 16. When image data of an amount corresponding to at least one page has been stored in the image memory 16, the CPU 17 reads the image data of one page from the memory 16 and delivers decoded one-page image data to the printer controller 18. Upon receipt the image data of the page from the CPU 17, the printer controller 18 controls the printer 19 so as to print the image information contained in this page.

During printing of this image information, the CPU 17 receives the image information of the next page. Thus, the receiving of the image information and recording of the received image information are conducted in parallel.

Examples 1 to 36 of Electrophotographic photosensitive member

A solution was prepared by dissolving, in 95 g of methanol, 5 g of methoxymethylated nylon (mean molecular weight 32,000) and 10 g of alcohol soluble copolymer nylon (mean molecular weight 29.000). The solution was applied with a Meyer bar to the surface of an aluminum substrate, thus forming an undercoat layer o1 μm thick after drying. Then, 5 g of Pigment Example 1 was added to a solution which was formed by dissolving 2 g of butyral resin (butyralation degree 63, 2 mol %) in 95 ml of cyclohexane, and was dispersed by a sand mill for 20 hours. The dispersion liquid was then applied to the surface of the above-mentioned undercoating layer by means of Meyer bar and was dried so as to become a charge generating layer 0.2 μm thick.

Subsequently, a solution was formed by dissolving, in 40 ml of toluene, 5 g of a hydrazone compound having the following composition and 5 g of polymethylmethacrylate (number means molecular weight 100,000).

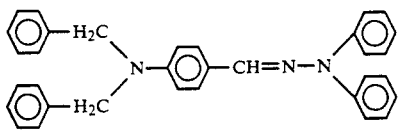

The solution was applied to the surface of the above-mentioned charge generating layer by means of Meyer bar so as to form a charge transporting layer 20 μm thick after drying, whereby Example 1 of the electrophotographic photosensitive member of the invention was formed.

Examples 2 to 36 of the electrophotographic photosensitive member of the invention were formed by the same process as Example 1, except that Pigment Examples shown in Table 1 below were used in place of the Pigment Example 1.

These electrophotographic photosensitive members were tested by an electrostatic copying paper tester (model SP-428, produced by Kawaguchi Denki Kabushiki Kaisha). More specifically, each electrophotographic photosensitive member was subjected to corona charging to −5KV, holding in a dark place for 1 second and exposure at an illuminance of 10 lux. The charging characteristic of each Example was evaluated both in terms of the surface potential Vo and the amount of exposure required until the surface potential E after the dark preservation was reduced to half (E½), i.e., the sensitivity. The results of the evaluation are shown in Table 1.

TABLE 1

| Example | Pigment Example | Vo (−V) | E½ (lux · sec) |
|---|---|---|---|
| 1 | 1 | 680 | 1.5 |
| 2 | 3 | 690 | 2.0 |
| 3 | 6 | 695 | 1.8 |

TABLE 1-continued

| Example | Pigment Example | Vo (−V) | E½ (lux · sec) |
|---|---|---|---|
| 4 | 9 | 700 | 2.0 |
| 5 | 17 | 705 | 2.2 |
| 6 | 21 | 685 | 2.5 |
| 7 | 26 | 680 | 2.8 |
| 8 | 27 | 695 | 2.7 |
| 9 | 32 | 690 | 2.6 |
| 10 | 34 | 700 | 2.5 |
| 11 | 35 | 695 | 2.4 |
| 12 | 36 | 685 | 2.5 |
| 13 | 40 | 680 | 1.7 |
| 14 | 41 | 690 | 1.8 |
| 15 | 43 | 695 | 2.0 |
| 16 | 45 | 700 | 2.1 |
| 17 | 49 | 705 | 1.9 |
| 18 | 57 | 680 | 1.8 |
| 19 | 62 | 685 | 1.7 |
| 20 | 64 | 700 | 1.9 |
| 21 | 71 | 705 | 2.0 |
| 22 | 75 | 695 | 2.1 |
| 23 | 77 | 690 | 2.2 |
| 24 | 79 | 700 | 2.3 |
| 25 | 80 | 675 | 2.0 |
| 26 | 82 | 700 | 2.0 |
| 27 | 83 | 685 | 1.9 |
| 28 | 84 | 690 | 1.5 |
| 29 | 87 | 705 | 2.1 |
| 30 | 90 | 695 | 2.8 |
| 31 | 91 | 690 | 2.9 |
| 32 | 95 | 700 | 2.4 |
| 33 | 98 | 680 | 2.3 |
| 34 | 102 | 690 | 2.5 |
| 35 | 106 | 695 | 2.8 |
| 36 | 108 | 705 | 2.9 |

Comparison Examples 1 to 7

Using the following pigments, electrophotographic photosensitive members as Comparison Examples 1 to 7 were produced in the same process as Example 1, and were evaluated in the same manner as Example 1 to obtain results as shown in Table 2.

Comparison Example 1 of Pigment

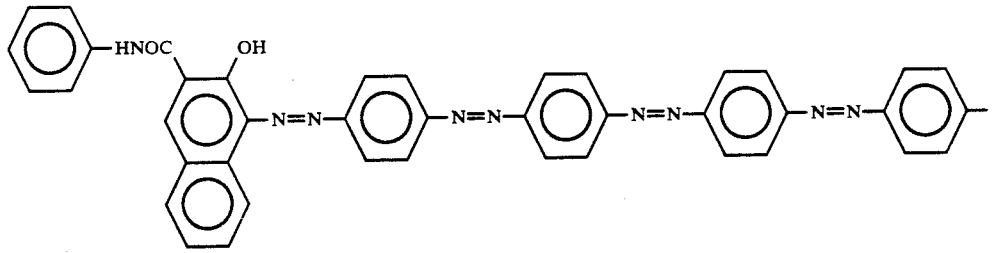

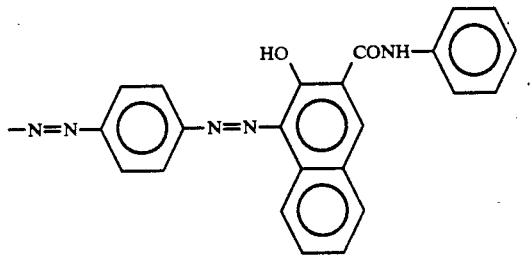

Comparison Example 2 of Pigment

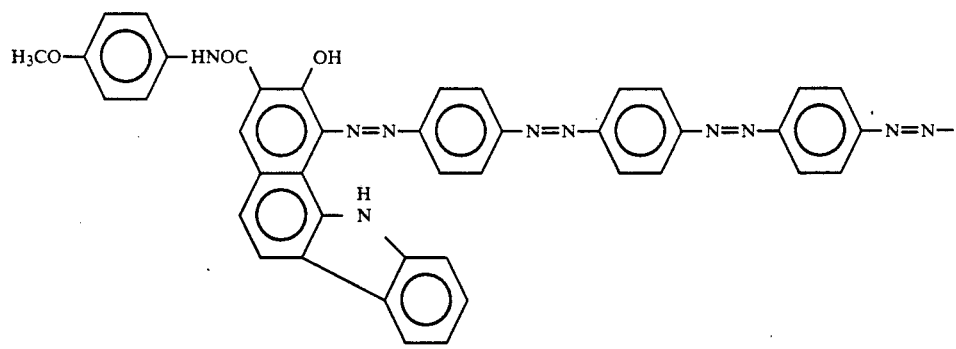
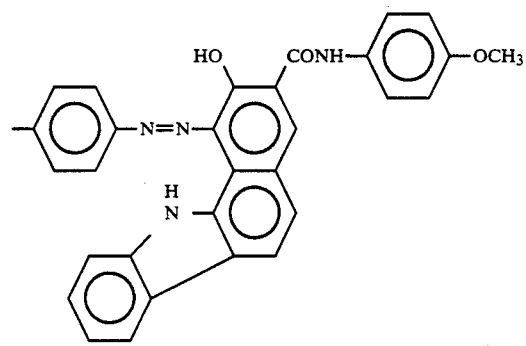
Comparison Example 3 of Pigment
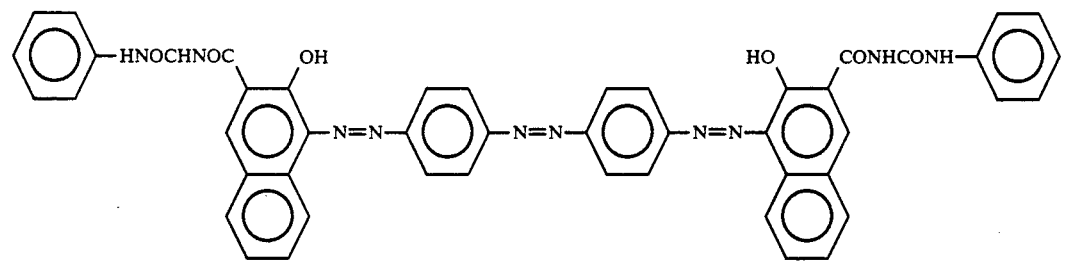
Comparison Example 4 of Pigment
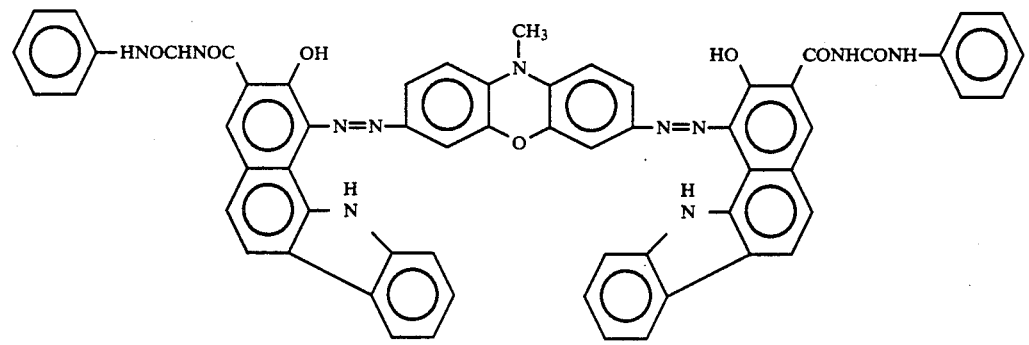
Comparison Example 5 of Pigment -continued

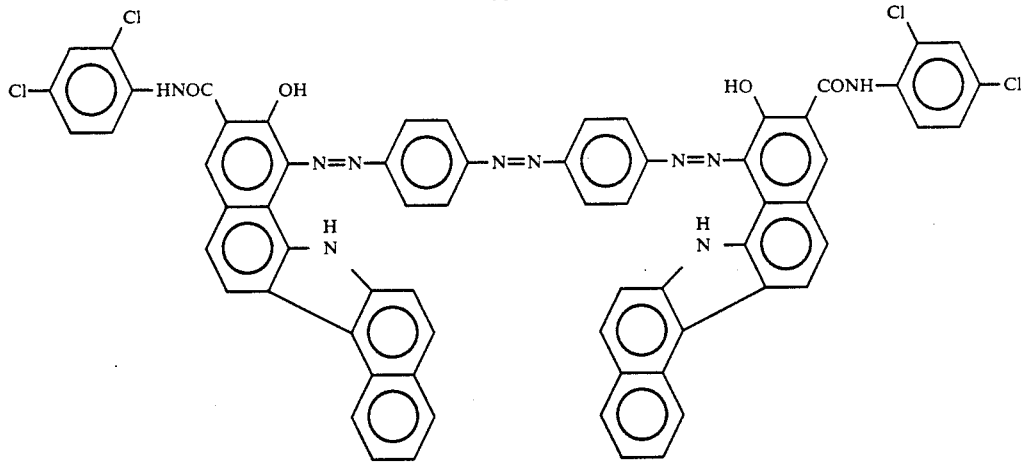

Comparison Example 6 of Pigment

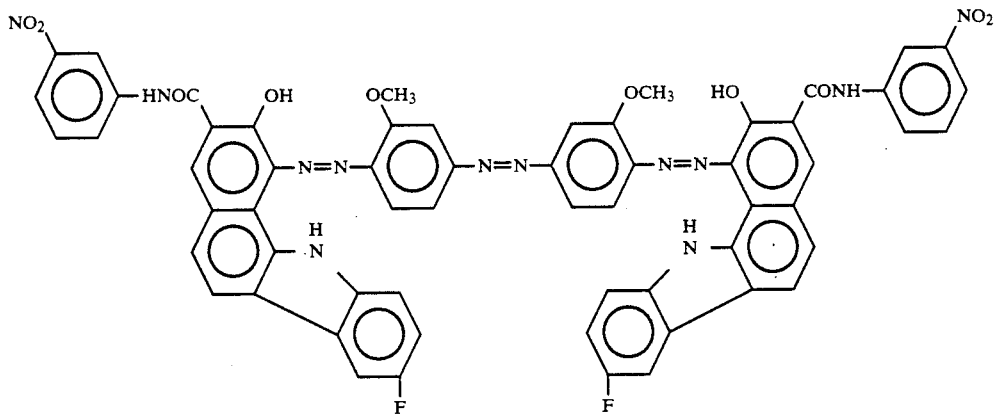

Comparison Example 7 of Pigment

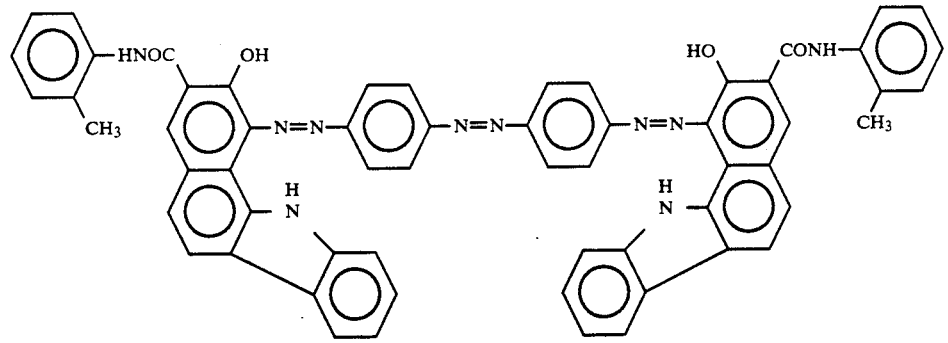

TABLE 2

| Comp. Example | Comp. Ex. of Pigment | Vo (−V) | E½ (lux · sec) |
|---|---|---|---|
| 1 | 1 | 660 | 4.5 |
| 2 | 2 | 655 | 4.2 |
| 3 | 3 | 670 | 3.9 |
| 4 | 4 | 665 | 4.5 |
| 5 | 5 | 660 | 4.3 |
| 6 | 6 | 655 | 4.1 |
| 7 | 7 | 650 | 5.4 |

Examples 37 to 45 of Electrophotographic photosensitive member

Electrophotographic photosensitive members of Examples 2, 5, 10, 14, 17, 22, 26, 32 and 36 were tested as Examples 37, 38, 39, 40, 41, 42, 43, 44 and 45, respectively, for measurement of fluctuation of the dark potential and bright potential after repeated use.

Each electrophotographic photosensitive member was adhered to a cylinder of an electrophotographic copying apparatus having a corona charger of −6.5 KV, an exposure optical system, a developing unit, a transfer charger, a charge-removing optical system and a cleaner. The electrophotographic photosensitive member was subjected to 5,000 copying cycles on this apparatus, with the initial dark potential $V_D$ and the initial bright potential $V_L$ set at about $-700$ V and $-200$ V, respectively, and the amounts $\Delta V_D$ and $\Delta V_L$ of variations of the dark and bright potentials after the 5,000 copying cycles were measured. The results are shown in Table 3. In Table 3, the minus sign (−) represents a reduction in the absolute value of the potential, while the plus sign (+) indicates an increase in the absolute value of the potential.

TABLE 3

| Example | Example of Pigment | $\Delta V_D$ (V) | $\Delta V_L$ (V) |
|---|---|---|---|
| 37 | 3 | −10 | +15 |
| 38 | 17 | −15 | +5 |
| 39 | 34 | −10 | +10 |
| 40 | 41 | −10 | +5 |
| 41 | 49 | −10 | +10 |
| 42 | 75 | −15 | +10 |
| 43 | 82 | −10 | +15 |
| 44 | 95 | −15 | +5 |
| 45 | 108 | −10 | +10 |

Comparison Examples 8 to 14

The electrophotographic photosensitive members of Comparison Examples 1 to 7 were tested as Comparison Examples 8 to 14, respectively, and were tested in the same method as Example 37 for measurement of variation in the potentials after repeated use. The results are shown in Table 4.

TABLE 4

| Comp. Example | Comp. Ex. of Pigment | $\Delta V_D$ (V) | $\Delta V_L$ (V) |
|---|---|---|---|
| 8 | 1 | −90 | +80 |
| 9 | 2 | −95 | +75 |
| 10 | 3 | −80 | +90 |
| 11 | 4 | −85 | +75 |
| 12 | 5 | −80 | +80 |
| 13 | 6 | −90 | +70 |
| 14 | 7 | −90 | +85 |

Examples 46 to 48 of Electrophotographic photosensitive Member

An aluminum film was formed by evaporation deposition, or a polyethylene terephthalate film and a film of polyvinylalcohol of 0.2 μm thick was formed on the surface of the aluminum film. A dispersion liquid of Pigment Example 29 was applied by a Meyer bar on the surface of the polyvinylalcohol layer and was then dried to form a charge generating layer of 0.2 μm thick.

A solution was formed by dissolving, in 40 ml of tetrahydrofuran, 5 g of styryl compound having the following composition and 5 g of polyallylate (condensed polymer of bisphenol A and terephthalic acid-isophthalic acid). The solution was applied to the surface of the above-mentioned charge generating layer and then dried to form a charge transporting layer of 20 μm thick.

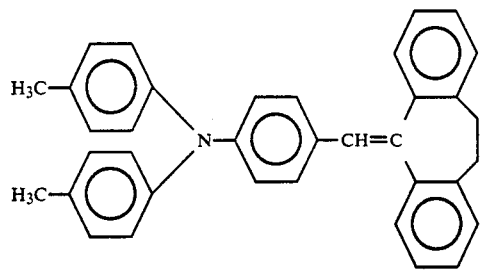

Charging characteristics and durability of the thus formed electrophotographic photosensitive members were evaluated by the same methods as those used for the evaluation of Examples 1 to 37 of the electrophotographic photosensitive member of the invention. The results is shown in Table 5.

TABLE 5

| Examples | Pigment Examples | Vo (−V) | $E_{\frac{1}{2}}$ (lux · sec) | $\Delta$Vo (V) | $\Delta V_L$ (V) |
|---|---|---|---|---|---|
| 46 | 36 | 695 | 2.2 | −10 | +5 |
| 47 | 79 | 700 | 2.3 | −10 | +10 |
| 48 | 108 | 690 | 2.1 | −5 | +10 |

Examples 49 to 51 Electrophotographic photosensitive Member

Examples 49, 50 and 51 of the electrophotographic photosensitive members were produced by forming the charge generating layers and the charge transporting layers of Examples 10, 22 and 34 in the reverse order of that in Examples 10, 22 and 23. Charging characteristics of the thus produced electrophotographic photosensitive members were evaluated in the same manner as Example 1. In this case, however, charging was conducted to provide positive potentials.

TABLE 6

| Example | Example of Pigment | Vo (V) | $E_{\frac{1}{2}}$ (lux · sec) |
|---|---|---|---|
| 49 | 34 | 700 | 3.6 |
| 50 | 75 | 705 | 3.5 |
| 51 | 102 | 700 | 3.7 |

Examples 52 to 54 of Electrophotographic photosensitive Member

A solution was prepared by adding, to 70 ml of chlorobenzene, 5 g of 2,4,7-trinitro-9-fluorenone and 5 g of poly-4,4'-dioxidiphenyl-2,2-propane carbonate (mean molecular weight 30,000). This solution was applied to the charge generating layers of Examples 9, 21 and 33 of the electrophotographic photosensitive member of the invention. The applied solution became a charge transporting layer 15 μm thick after drying, thus producing Examples 52 to 54 of the electrophotographic photosensitive member of the present invention. Charging characteristics of these Examples of the electrophotographic photosensitive member of the present invention were measured and evaluated in the same method as Example 1. In this case, the charging was effected to provide positive potentials. The results are shown in Table 7.

TABLE 7

| Example | Example of Pigment | Vo (V) | E½ (lux · sec) |
|---|---|---|---|
| 52 | 32 | 690 | 4.5 |
| 53 | 71 | 680 | 4.5 |
| 54 | 98 | 685 | 4.6 |

Examples 55 to 57 of Electrophotographic photosensitive Member

A charge moving complex was prepared by dissolving, in 70 ml of tetrahydrofuran, 5 g of 2,4,7-trinitro-9-fluorenone and 5 g of poly-N-vinylcarbazole (number mean molecular weight 30,000).

Three types of dispersion liquids were formed by adding this charge moving complex to 70 ml of tetrahydrofuran, together with 5 g of polyester (commercial name byron: produced by Toyo Boseki Kabushiki Kaisha) and 1 g of Examples 18, 57 and 97 of the pigment, respectively. Each of these dispersion liquids was then applied to an undercoat layer which was prepared by the same process as Example 1 to form a photosensitive layer of 16 μm thick after drying. The thus prepared three types pf electrophotographic photosensitive members were evaluated by the same method as Example 1. The charging was conducted to provide positive potentials. The results of evaluation are shown in Table 8.

TABLE 8

| Example | Example of Pigment | Vo (V) | E½ (lux · sec) |
|---|---|---|---|
| 55 | 18 | 695 | 4.6 |
| 56 | 57 | 690 | 4.5 |
| 57 | 97 | 685 | 4.6 |

Examples 58 to 75 of Electrophotographic photosensitive Member

Examples 1, 3, 5, 7, 9, 12, 13, 15, 18, 20, 22, 24, 25, 27, 29, 31, 32 and 35 were tested by using an electrostatic copying paper tester (modified version of Model SP-428, produced by Kawaguchi Denki Kabushiki Kaisha) which incorporates a tungsten light source in place of the combination of the semiconductor laser with an emission wavelength of 780 nm and the scanning unit of the Model SP-428. The test was conducted in static-type method, in which each Example was corona-charged at −5.5 KV and then held in a dark place for 1 second, followed by an exposure to a laser light. The surface potential (Vo) and the amount of the exposure light (E½) required for attenuating the potential to ½ the level of the potential attained after the 1-second dark attenuation. The results are shown in Table 9.

TABLE 9

| Example | Example of Pigment | Vo (−V) | E½ (lux · sec) |
|---|---|---|---|
| 58 | 1 | 680 | 2.4 |
| 59 | 6 | 675 | 2.5 |
| 60 | 17 | 700 | 2.6 |
| 61 | 26 | 690 | 3.0 |
| 62 | 32 | 690 | 2.6 |
| 63 | 36 | 685 | 3.1 |
| 64 | 40 | 680 | 2.2 |
| 65 | 43 | 700 | 2.3 |
| 66 | 57 | 690 | 2.0 |
| 67 | 64 | 685 | 2.4 |
| 68 | 75 | 680 | 2.3 |
| 69 | 79 | 690 | 2.5 |
| 70 | 80 | 680 | 2.3 |
| 71 | 83 | 675 | 2.8 |
| 72 | 87 | 685 | 3.1 |
| 73 | 91 | 700 | 3.1 |
| 74 | 95 | 690 | 2.9 |
| 75 | 106 | 690 | 3.0 |

Comparison Examples 15 to 21

Comparison examples 1 to 7 of electrophotographic photosensitive members of were tested as Comparison Examples 15 to 21 for evaluation of the charging characteristics in the same method as Example 58, the results being shown in Table 10.

TABLE 10

| Comp. Example | Comp. Ex. of Pigment | Vo (−V) | E½ (lux · sec) |
|---|---|---|---|
| 15 | 1 | 660 | 5.3 |
| 16 | 2 | 655 | 5.4 |
| 17 | 3 | 660 | 6.0 |
| 18 | 4 | 655 | 6.3 |
| 19 | 5 | 655 | 4.5 |
| 20 | 6 | 650 | 4.9 |
| 21 | 7 | 650 | 5.3 |

Examples 76 to 79 of Electrophotographic photosensitive Member

Examples 4, 6, 15 and 17 of the electrophotographic photosensitive member of the invention were tested as Examples 76, 77, 78 and 79, respectively, by the aforementioned electrostatic copying paper tester which in this case employed a monochromatic light having a light intensity of 1 μw/cm², for the purpose of measurement of spectral sensitivity. Then, the variation of the sensitivity in the wavelength region between 770 and 800 nm, which conforms with the emission wavelength region of an ordinary laser, was determined in terms of the ratio ΔE between the sensitivity E(800 nm) attained at the wavelength of 800 nm and the sensitivity E(770 nm) attained at the wavelength of 770 nm, in accordance with the following formula.

$$\Delta E = E(800 \text{ nm})/E(770 \text{ nm})$$

To determine the sensitivity E at each wavelength, the dark potential $V_D$ of the surface of each electrophotographic photosensitive member $V_D$ was set to −700 V and the amount of exposure EΔ500 V (μJ/cm2) required for attenuating the surface potential to −200 V was measured. Then, the sensitivity E (V·cm²/μJ) was determined in accordance with the following formula.

$$E(V \cdot cm^2/\mu J) = 500(V)/E\Delta 500V(\mu J/cm2)$$

The results are shown in Table 11.

TABLE 11

| Example | Example of Pigment | ΔE |
|---|---|---|
| 76 | 9 | 0.98 |
| 77 | 21 | 0.97 |
| 78 | 43 | 0.98 |

Comparison Examples 22 to 25

Comparison Examples 1 to 4 were subjected as Comparison Examples to measurement of charging characteristics conducted in the same manner as that for Example 76. The results are shown in Table 12.

TABLE 12

| Comparison Example | Comp Ex. of Pigment | ΔE |
|---|---|---|
| 22 | 1 | 0.49 |
| 23 | 2 | 0.51 |
| 24 | 3 | 0.48 |
| 25 | 4 | 0.52 |

Examples 80 and 81

For the purpose of examination of imaging characteristics, examples 3 and 16 of the electrophotographic photosensitive member were tested tested as Examples 80 and 81 on an electrophotographic copying apparatus having a corona charger of −5.6 KV, an exposure optical system, a developing unit, a transfer charger, a charge removing optical system and a cleaner. The test was conducted by continuously producing copies with each of these Examples of the electrophotographic photosensitive member, under each of three different conditions: namely, in air at 5° C. and 10% relative humidity, at 18° C. and 50% relative humidity and at 35° C. and 80% relative humidity. All these Examples could produce excellent images with a high degree of fidelity and without any blots and blurs, even after continuous production of 10,000 copies, thus proving the superior performance of the electrophotographic photosensitive members of the present invention.

Examples 82 and 83

Examples 29 and 33 of the electrophotographic photosensitive member of the present invention were tested as Examples 82 and 83 on a color laser copying machine (Model CLC-1, produced by Canon Inc.) for continuous production of 10,000 copies at a laser beam exposure rate of 3.0 μJ/cm².

A test also was conducted in which these Examples were left for 20 hours in an atmosphere at 30° C. and 80% relative humidity and then subjected to a test copying operation on the above-mentioned color laser copying apparatus.

The results are shown in Table 13.

TABLE 13

| Examples | Examples of Pigment | Initial Image Quality | Image quality after production of 10000 copies | Image quality after keeping at 30° C., 80% RH |
|---|---|---|---|---|
| 82 | 87 | No abnormality | No abnormality | No abnormality |
| 83 | 98 | No abnormality | No abnormality | No abnormality |

Comparison Examples 26 and 27

Comparison Examples 26 and 27 of electrophotographic photosensitive member were formed in the same process as Example 1 except that the comparison pigments 8 and 9 having the following compositions were respectively used in place of the Pigment Example 1 used in Example 1 of electrophotographic photosensitive member, and were tested and evaluated in the same manner as Example 82. The results are shown in Table 14.

(Comparison Pigment 8)

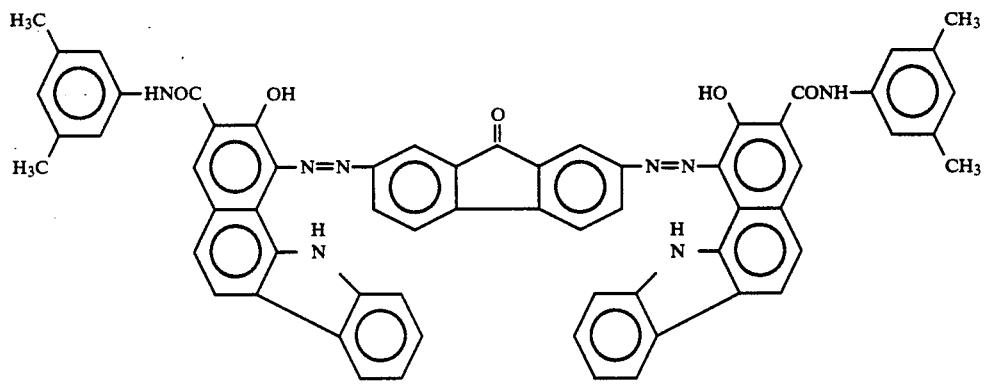

(Comparison Pigment 9)

-continued

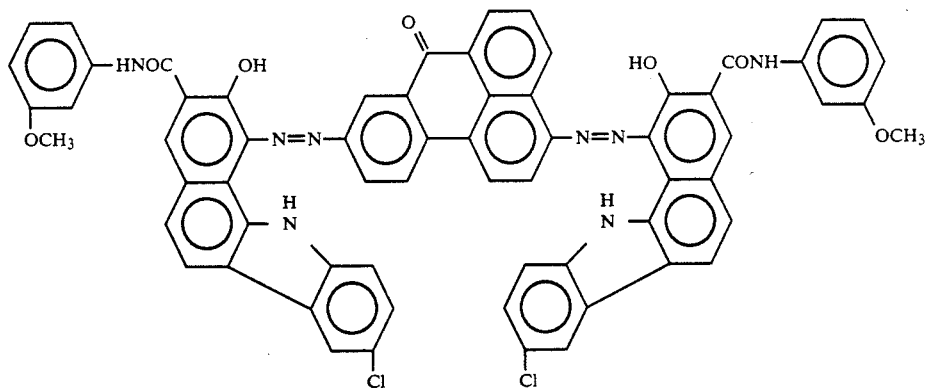

TABLE 14

| Comparison Examples | Comparison Examples of Pigment | Initial Image Quality | Image quality after production of 10000 copies | Image quality after keeping at 30° C., 80% RH |
|---|---|---|---|---|
| 82 | 8 | No abnormality | Local generation of black spots | No abnormality |
| 83 | 9 | No abnormality | Generation of black spots | No abnormality |

What is claimed is:

1. An electrophotographic photosensitive member comprising: a conductive substrate and a photosensitive layer on the conductive substrate, said photosensitive layer containing an azo pigment of the following formula (1):

$$CP_1-N=N-Ar_1-(N=N-Ar_2)-N=N-Cp_2 \ldots \quad (1)$$

wherein $Ar_1$ and $Ar_2$ are each a substituted or unsubstituted aromatic cyclic group optionally bonded through a bonding group or a substituted or unsubstituted heterocyclic group optionally bonded through a bonding group, and $cp_1$ and $cp_2$ are each a group having the following formula (2), (3), (4) or (5):

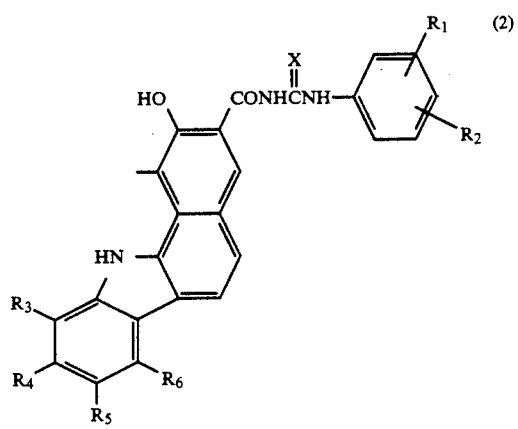

(2)

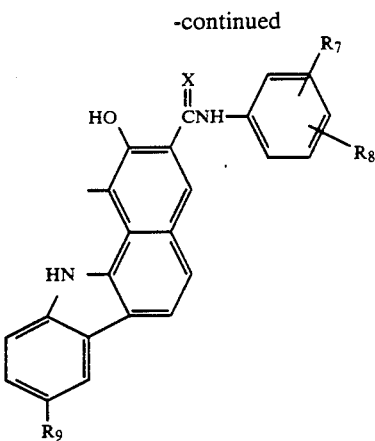

(3)

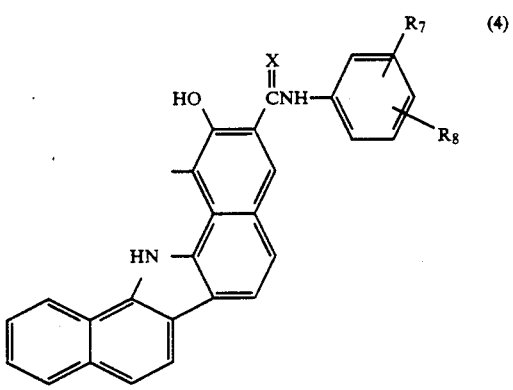

(4)

-continued

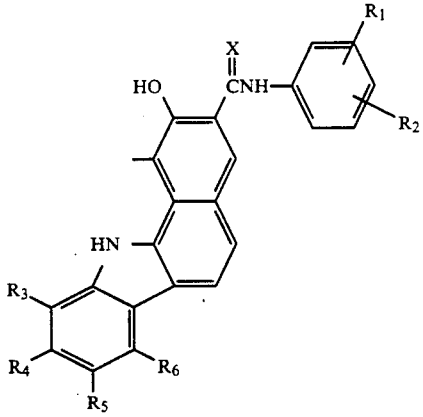
(5)

wherein $R_1$ and $R_2$ are each a hydrogen atom, a halogen atom, a nitro group, a cyano group, a trifluoromethyl group, a substituted or unsubstituted alkyl group, a substituted or unsubstituted alkoxy group, a substituted or unsubstituted aralkyl group, a substituted or unsubstituted allyl group, a substituted or unsubstituted heterocyclic group, or a substituted or unsubstituted amino group; $R_3$, $R_4$, $R_5$ and $R_6$ are each a hydrogen atom or a halogen atom, with the proviso that $R_3$, $R_4$, $R_5$ and $R_6$ are not all simultaneously hydrogen atoms, and $R_3$, $R_4$, $R_5$, and $R_6$, respectively, may form a condensed ring together with part of the carbazole ring; $R_7$ is a nitro group; $R_8$ is a halogen atom, a nitro group, a cyano group, a trifluoromethyl group, a substituted or unsubstituted aralkyl group, a substituted or unsubstituted allyl group, a substituted or unsubstituted heterocyclic group, or a substituted or unsubstituted amino group, $R_9$ is a chlorine atom or bromine atom; and X is an oxygen atom or a sulfur atom; with the proviso that when n is 1, $cp_1$ and $cp_2$ have the formula (2), (3) or (4), and when n is 2 or 3, $cp_1$ and $cp_2$ have the formula (2) or (5).

2. An electrophotographic photosensitive member according to claim 1, wherein said photosensitive layer has a charge generating layer and a charge transporting layer.

3. An electrophotographic photosensitive member according to claim 2, wherein said charge transporting layer is spaced between said conductive substrate and said charge generating layer.

4. An electrophotographic photosensitive member according to claim 2, wherein said charge generating layer is spaced between said conductive substrate and said charge transporting layer.

5. An electrophotographic photosensitive member according to claim 1, wherein said photosensitive layer is a single layer.

6. An electrophotographic photosensitive member according to claim 1, further comprising an undercoat layer spaced between said conductive substrate and said photosensitive layer.

7. An electrophotographic photosensitive member according to claim 1, wherein said photosensitive layer is spaced between the conductive substrate and a protective layer.

8. An electrophotographic apparatus comprising (i) the electrophotographic photosensitive member of claim 1; (ii) means for forming an electrostatic latent image on said electrophotographic photosensitive member, (iii) means for developing the electrostatic latent image, and (iv) means for transferring the developed image to a transfer member 9. A device unit demountably mounted on an electrophotographic apparatus and integrally comprising: (i) the electrophotographic photosensitive member of claim 1; (ii) charging means for electrostatically charging said electrophotographic photosensitive member; and (iii) cleaning means for cleaning said electrophotographic photosensitive member.

10. A device unit according to claim 9, wherein said device unit further comprises a developing unit.

11. A facsimile machine, comprising an electrophotographic apparatus and receiving means for receiving image information transmitted from a remote station, said electrophotographic apparatus including the electrophotographic photosensitive member of claim 1.

* * * * *

UNITED STATES PATENT AND TRADEMARK OFFICE
CERTIFICATE OF CORRECTION

PATENT NO. : 5,093,218                                    Page 1 of 4
DATED     : March 3, 1992
INVENTOR(S) : TOSHIE MIYAJI, ET AL.

It is certified that error appears in the above-identified patent and that said Letters Patent is hereby corrected as shown below:

IN [57] ABSTRACT line 6, "CP$_1$" should read --Cp$_1$--.
line 11, "cp$_1$ and cp$_2$" should read --Cp$_1$ and Cp$_2$--.
line 6, "allyl" should read --aryl--.
line 10, "R3," should read --R$_3$,--.
line 11, "R4, R5 and R6," should read
     --R$_4$, R$_5$ and R$_6$,--.
line 16, "allyl" should read --aryl--.
line 20, "cp$_1$ and cp$_2$" should read --Cp$_1$ and Cp$_2$--.
line 21, "cp$_1$ and cp$_2$" should read --Cp$_1$ and Cp$_2$--.

COLUMN 1

Line 13, "an" should be deleted.
Line 21, "ss" should read --as--.
Line 39, "4123270, 4247614, 4251613, 4251614, 4256821,
     4260672" should read --4,123,270, 4,247,614,
     4,251,613, 4,251,614, 4,256,821, 4,260,672--.
Line 40, "and 4293628." should read --and 4,293,628.--.
Line 47, "a" should be deleted.

COLUMN 2

Line 27, "a" should be deleted.
Line 42, "CP$_1$" should read --Cp$_1$--.
Line 49, "cp$_1$ and cp$_2$" should read --Cp$_1$ and Cp$_2$--.

COLUMN 3

Line 55, "allyl" should read --aryl--.
Line 65, "allyl" should read --aryl--.
Line 66, "group," should read --group;--.

UNITED STATES PATENT AND TRADEMARK OFFICE
CERTIFICATE OF CORRECTION

PATENT NO. : 5,093,218

DATED : March 3, 1992

INVENTOR(S) : TOSHIE MIYAJI, ET AL.

It is certified that error appears in the above-identified patent and that said Letters Patent is hereby corrected as shown below:

COLUMN 4

Line 1, "cp$_1$ and cp$_2$" should read --Cp$_1$ and Cp$_2$--.
Line 2, "cp$_1$ and cp$_2$" should read --Cp$_1$ and Cp$_2$--.
Line 23, "groups" should read --group--.
Line 38, "fluole-" should read --fluore- --.
Line 51, "R1, R2" should read --R$_1$, R$_2$--.
Line 52, "R8" should read --R$_8$--.
Line 55, "allyl" should read --aryl--.
Line 62, "allyl" should read --aryl--.

COLUMN 85

Line 54, "easily" should read --easily be--.

COLUMN 87

Line 55, "6/37 g" should read --6.37 g--.

COLUMN 88

Line 22, "2-hour," should read --2 hours,--.
Line 65, "2-hour," should read --2 hours,--.

COLUMN 89

Line 12, "layers" should read --layer--.
Line 32, "one-" should read --one,--.
Line 34, "which is known." should read --.--.
Line 38, "polyallylate" should read --polyarylate--.
Line 40, "an" should read --and--.

UNITED STATES PATENT AND TRADEMARK OFFICE
CERTIFICATE OF CORRECTION

PATENT NO. : 5,093,218
DATED : March 3, 1992
INVENTOR(S) : TOSHIE MIYAJI, ET AL.

It is certified that error appears in the above-identified patent and that said Letters Patent is hereby corrected as shown below:

COLUMN 90

Line 19, "triallylmethane" should read --triarylmethane--.
Line 30, "polyallylate" should read --polyarylate--.

COLUMN 91

Line 20, "which" should read --which is--.
Line 42, "SPACE" should read --space--.

COLUMN 92

Line 2, "a" should be deleted.
Line 38, "receipt" should read --receipt of--.
Line 53, "29.000)." should read --29,000).--.
Line 56, "ol µm" should read --0.1 µm--.

COLUMN 99

Line 62, "polyallylate" should read --polyarylate--.

COLUMN 101

Line 25, "pf" should read --of--.

COLUMN 102

Line 54, "(µJ/cm2)" should read --(µJ/cm$^2$)--.
Line 59, "(µJ/cm2)" should read --(µJ/cm$^2$)--.

COLUMN 103

Line 18, "tested" (second occurrence) should be deleted.

UNITED STATES PATENT AND TRADEMARK OFFICE
CERTIFICATE OF CORRECTION

PATENT NO. : 5,093,218
DATED : March 3, 1992
INVENTOR(S) : TOSHIE MIYAJI, ET AL.

It is certified that error appears in the above-identified patent and that said Letters Patent is hereby corrected as shown below:

COLUMN 105

Line 43, "$CP_1-N=N-Ar_1-(N=N-Ar_2)-N=N-Cp_2$" should read $--CP_1-N=N-Ar_1-(N=N-Ar_2)n-N=N-Cp_2--$.
Line 49, "$cp_1$ and $cp_2$" should read $--Cp_1$ and $Cp_2--$.

COLUMN 107

Line 24, "allyl" should read --aryl--.
Line 28, "R3, R4," should read --$R_3$, $R_4$,--.
Line 29, "R5, and R6," should read --$R_5$, and $R_6$,--.
Line 34, "allyl" should read --aryl--.
Line 35, "group," (second occurrence) should read --group;--.
Line 39, "$cp_1$ and $cp_2$" should read --$Cp_1$ and $Cp_2$--.
Line 40, "$cp_1$ and $cp_2$" should read --$Cp_1$ and $Cp_2$--.

Signed and Sealed this

Fourteenth Day of June, 1994

Attest:

BRUCE LEHMAN

Attesting Officer     Commissioner of Patents and Trademarks